US012792773B1

(12) United States Patent
Schmitt et al.

(10) Patent No.: US 12,792,773 B1
(45) Date of Patent: Nov. 10, 2026

(54) APPARATUS FOR AND METHOD OF PREVENTING LEAKAGE OF SENSITIVE DATA TO ARTIFICIAL INTELLIGENCE SYSTEM

(71) Applicant: Longevity Strategists, Inc., Falls Church, VA (US)

(72) Inventors: Suzanne Schmitt, Summerville, SC (US); Jennifer Late, Tysons, VA (US); Tom West, Falls Church, VA (US); Eli Wood, Boulder, CO (US); Keith Pattison, Boulder, CO (US); Bobby Nicholson, Austin, TX (US)

(73) Assignee: Longevity Strategists, Inc., Falls Church, VA (US)

( * ) Notice: Subject to any disclaimer, the term of this patent is extended or adjusted under 35 U.S.C. 154(b) by 0 days.

(21) Appl. No.: 19/421,603

(22) Filed: Dec. 16, 2025

(51) Int. Cl.
*G06F 21/55* (2013.01)
*G06F 21/31* (2013.01)
(Continued)

(52) U.S. Cl.
CPC .......... *G06F 21/6245* (2013.01); *G06F 21/31* (2013.01); *G06F 21/602* (2013.01); *H04L 63/0471* (2013.01)

(58) Field of Classification Search
CPC .... G06F 21/6245; G06F 21/31; G06F 21/602; H04L 63/0471
See application file for complete search history.

(56) References Cited

U.S. PATENT DOCUMENTS

2009/0313403 A1* 12/2009 Cheong .................. G06F 21/83 710/67
2022/0100874 A1* 3/2022 Singh ................. G06F 21/6218
(Continued)

FOREIGN PATENT DOCUMENTS

CN 116595977 A 8/2023
IN 202311026659 A 5/2023
(Continued)

OTHER PUBLICATIONS

Kumar et al., Aquilis: Using Contextual Integrity for Privacy Protection on Mobile Devices, Dec. 2020, ACM DL Digital Library, vol. 4, Issue 4, pp. 1-29 (Year: 2000).*
(Continued)

*Primary Examiner* — Ellen Tran
(74) *Attorney, Agent, or Firm* — Caldwell LLC

(57) ABSTRACT

An apparatus for and method of preventing leakage of sensitive data to an artificial intelligence system are disclosed. The apparatus includes at least a processor and a memory that configures the processor to access a user interface operated by a user through a user device, detect a textual input from the user at the user interface, and execute a plurality of processing schemes in a cascading sequence to identify one or more processing elements within the textual input. The processor is further configured to generate a processed textual input by modifying each of the identified processing elements using one or more corresponding data masks, continue executing the plurality of processing schemes on the processed textual input until no further processing elements are identified, and, in response to that determination, route the processed textual input to an external system for processing and display the processed textual input at the user interface.

20 Claims, 8 Drawing Sheets

(51) Int. Cl.

| | |
|---|---|
| ***G06F 21/62*** | (2013.01) |
| *G06F 21/60* | (2013.01) |
| *H04L 9/40* | (2022.01) |

(56) References Cited

U.S. PATENT DOCUMENTS

| | | | | |
|---|---|---|---|---|
| 2022/0188413 | A1* | 6/2022 | Singh | G06F 21/629 |
| 2025/0094619 | A1* | 3/2025 | Pasumarthi | G06F 21/6227 |
| 2025/0307418 | A1* | 10/2025 | Spencer | G06F 21/577 |

FOREIGN PATENT DOCUMENTS

| | | | |
|---|---|---|---|
| IN | 202541035589 | A | 5/2025 |
| KR | 102819284 | B1 | 6/2025 |
| KR | 102856568 | B1 | 9/2025 |

OTHER PUBLICATIONS

Cappello et al., Large Language Models and the Disappearing Private Sphere, Mar. 2024, Ethics and Technology Lab, Queen's University, Chapter 4, pp. 23-38 (Year: 2024).*

Chen et al., AI Safety Landscape for Large Language Models: Taxonomy, State-of-the-art and Future Directions, Jan. 2025, ACM Comput. Serv., pp. 1-96 (Year: 2025).*

* cited by examiner

APPARATUS FOR AND METHOD OF PREVENTING LEAKAGE OF SENSITIVE DATA TO ARTIFICIAL INTELLIGENCE SYSTEM

FIELD OF THE INVENTION

The present invention generally relates to the field of operational security in artificial intelligence (AI) environments. In particular, the present invention is directed to an apparatus for and method of preventing leakage of sensitive data to an artificial intelligence system.

BACKGROUND

AI systems are increasingly integrated to automate data processing, perform content generation, and facilitate natural language interactions. In many such use cases, sensitive information can be inadvertently input into AI-enabled systems. This can result in unintended disclosure of sensitive information to external systems. Accordingly, there exists a need for an improved system that addresses such challenges.

SUMMARY OF THE DISCLOSURE

In some aspects, the techniques described herein relate to an apparatus for preventing leakage of sensitive data to an artificial intelligence system. The apparatus includes at least a processor, and a memory communicatively connected to the at least a processor. The memory contains instructions configuring the at least a processor to access a user interface that a user operates using a user device, detect, at the user interface, a textual input from the user, execute a plurality of processing schemes in a cascading sequence to identify one or more processing elements within the textual input, wherein execution of a first processing scheme modifies the textual input to generate an intermediate representation and passes the intermediate representation to a subsequent processing scheme, and each of the plurality of processing schemes is configured to identify a different category of the one or more processing elements, generate a processed textual input by modifying each of the one or more processing elements using one or more corresponding data masks, continue the execution of the plurality of processing schemes on the processed textual input until no further processing elements are identified, and in response to determining that no further processing elements are identified within the processed textual input route the processed textual input to an external system for processing, and display, at the user interface, the processed textual input.

In some aspects, the techniques described herein relate to a method of preventing leakage of sensitive data to an artificial intelligence system, the method including accessing, using at least a processor, a user interface that a user operates using a user device, detecting, using the at least a processor and at the user interface, a textual input from the user, executing, using the at least a processor, a plurality of processing schemes in a cascading sequence to identify one or more processing elements within the textual input, wherein execution of a first processing scheme modifies the textual input to generate an intermediate representation and passes the intermediate representation to a subsequent processing scheme, and each of the plurality of processing schemes is configured to identify a different category of the one or more processing elements, generating, using the at least a processor, a processed textual input by modifying each of the one or more processing elements using one or more corresponding data masks, continuing, using the at least a processor, the execution of the plurality of processing schemes on the processed textual input until no further processing elements are identified, and in response to determining that no further processing elements are identified within the processed textual input routing, using the at least a processor, the processed textual input to an external system for processing, and displaying, using the at least a processor and at the user interface, the processed textual input.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
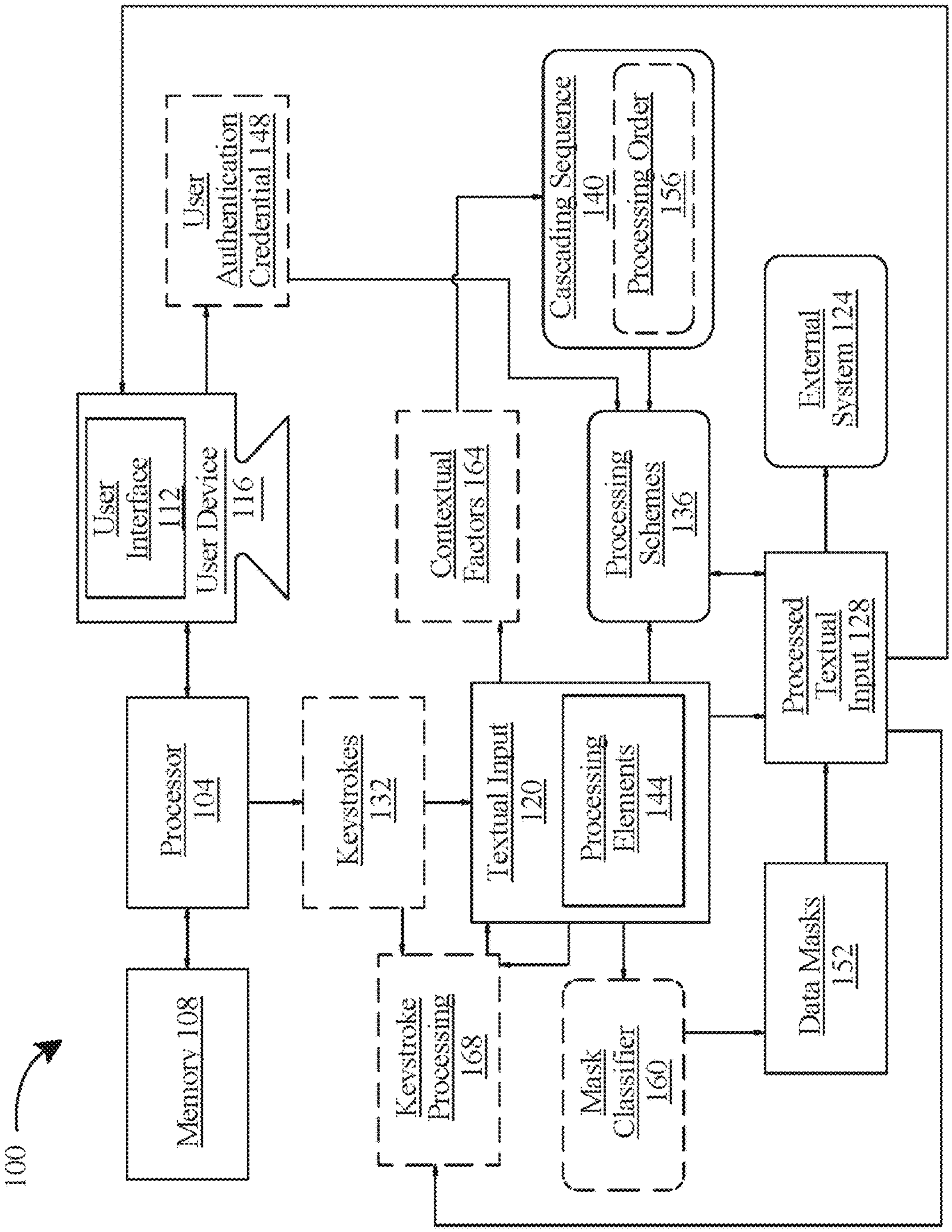
FIG. 1 illustrates a block diagram of an exemplary apparatus for preventing leakage of sensitive data to an artificial intelligence system.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses for and methods of preventing leakage of sensitive data to an artificial intelligence system. The apparatus includes at least a processor, and a memory communicatively connected to the at least a processor. The memory contains instructions configuring the at least a processor to access a user interface that a user operates using a user device, detect, at the user interface, a textual input from the user, execute a plurality of processing schemes in a cascading sequence to identify one or more processing elements within the textual input, wherein execution of a first processing scheme modifies the textual input to generate an intermediate representation and passes the intermediate representation to a subsequent processing scheme, and each of the plurality of processing schemes is configured to identify a different category of the one or more processing elements, generate a processed textual input by modifying each of the one or more processing elements using one or more corresponding data masks, continue the execution of the plurality of processing schemes on the processed textual input until no further processing elements are identified, and in response to determining that no further processing elements are identified within the processed textual input route the processed textual input to an external system for processing, and display, at the user interface, the processed textual input.

In an embodiment, advisors, clients, or other users often input sensitive information such as names, account numbers, or health details into chat applications or AI-based assistants while interacting rapidly across digital interfaces. Aspects of the present disclosure can be used to prevent inadvertent exposure of personally identifiable information (PII), protected health information (PHI), or other sensitive data during these interactions by implementing a locally executed, pluggable privacy-filtering library that intercepts textual input, including keystrokes and draft messages, directly within the browser prior to network transmission.

Aspects of the present disclosure can also be used to analyze and sanitize this textual input through a cascading sequence of processing schemes, such as regular expression detectors for structured identifiers and lightweight named entity recognition (NER) models for unstructured entities, executed in a controlled order and parallelization strategy to avoid overwriting or conflict among detections. This is so, at least in part, because processor is configured to locally process and mask sensitive data before it leaves the user device, allowing firm administrators to configure scanning policies, route sanitized data through zero-data-retention external systems, and provide inline feedback or hard-block transmission of unmasked PII or PHI. Through this technical architecture, the disclosed disclosure ensures privacy protection, compliance enforcement, and computational efficiency within real-time communication workflows, delivering a concrete technological improvement in secure data handling during human-AI interactions.

Exemplary embodiments illustrating aspects of the present disclosure are described below in the context of several specific examples.

Referring now to FIG. 1, an exemplary embodiment of apparatus 100 for preventing leakage of sensitive data to an artificial intelligence system is illustrated. Apparatus 100 may also be referred to as a system for preventing leakage of sensitive data to an artificial intelligence system. Apparatus 100 may include circuitry such as without limitation a processor 104 communicatively connected to a memory 108; for instance, circuitry may include and/or be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail using a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 104 may access the information from primary memory.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device. Communicative connecting may include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 108 is configured to store instructions that configure processor 104 to access a user interface 112 that a user operates using a user device 116. For the purposes of this disclosure, a "user interface" is an interactive presentation layer for data entry and output visualization. For example through the use of input devices and software. A user interface 112 may include a graphical user interface (GUI), command line interface (CLI), menu-driven user interface, touch user interface, voice user interface (VUI), form-based user interface, any combination thereof and the like. In some embodiments, user interface 112 may operate on and/or be communicatively connected to a decentralized platform, metaverse, and/or a decentralized exchange platform associated with the user. For example, a user may interact with user interface 112 in virtual reality. In some embodiments, a user may interact with user interface 112 using a computing device distinct from and communicatively connected to at least a processor 104. For example, a smart phone, smart, tablet, or laptop operated by a user. In an embodiment, user interface 112 may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run program, and the like because clicking on them yields instant access.

With continued reference to FIG. 1, for the purposes of this disclosure, a "user device" is a physical or virtual machine through which a user interacts with apparatus. As a non-limiting example, user interface 112 can be a graphical panel, chat window, browser extension, or text-entry box within a desktop or mobile application. As a non-limiting example, the user device 116 may include a laptop, desktop computer, tablet, mobile phone, smartphone, smart watch, kiosk terminal, display screen, smart headset, or any other computing device capable of transmitting or receiving data through a communication network. In some embodiments, the user device 116 may include an interface configured to receive one or more inputs from a user, such as keystrokes, voice commands, or touch gestures. In some embodiments, a user may manually input data into apparatus 100 using the user device 116. In some embodiments, the user device 116 may be configured to process, store, or transmit information independently of apparatus 100. For the purposes of this disclosure, a "user" is an individual or entity that interacts with apparatus 100 to initiate, supplement, or respond to data processing operations related to textual input 120 and privacy protection. A user may include, without limitation, a system operator, administrator, client, or end-user who provides information through a chat interface, chatbot, email application, customer service portal, or other communication system capable of transmitting textual input 120 to apparatus 100. The user may include a professional, advisor, or client communicating sensitive information, such as names, account numbers, health-related data, or personal identifiers, through a digital messaging platform. The user may interact with apparatus 100 through one or more interfaces, including but not limited to graphical user interfaces, browser-based interfaces, messaging windows, email clients, or application programming interfaces (APIs), all capable of transmitting or receiving textual, visual, or structured data prior to communication with an external system 124.

With continued reference to FIG. 1, in some embodiments, processor 104 may access user interface 112 locally when both components reside on the same user device 116. In such embodiments, user interface 112 may execute as an application or browser-based client running on the device's operating system, and processor 104 may communicate with it through inter-process communication channels, shared memory buffers, or system calls. In other embodiments, processor 104 may access user interface 112 remotely over a network connection, such as a secure web socket, hypertext transfer protocol (HTTP) session, or message-queue interface. In these cases, processor 104 may transmit display data packets representing textual input 120, processed textual input 128 or masking states, and may receive corresponding user actions such as keystrokes 132, pointer selections, or confirmation signals from the remote interface instance.

With continued reference to FIG. 1, in some embodiments, processor 104 may maintain an event listener within apparatus 100 to monitor user-initiated actions occurring at user interface 112. When an action such as a submission, edit, or navigation event is detected, processor 104 may parse the event metadata, retrieve the corresponding textual input 120 from memory 108, and initiate one or more processing schemes 136 in a cascading sequence 140. In some embodiments, processor 104 may update the visual state of user interface 112 in real time to reflect progress through cascading sequence 140, display processing elements 144 that have been masked, or provide interactive prompts requesting additional user confirmation before routing data to an external system 124.

With continued reference to FIG. 1, in some embodiments, processor 104 may access user interface 112 through an abstraction layer or application programming interface (API) that standardizes interaction commands and display formats across heterogeneous devices. This configuration may allow the same apparatus 100 to render and control user interface 112 on desktop browsers, mobile applications, or embedded terminals without modification to the core processing logic. In some embodiments, processor 104 may authenticate the communication channel using a user authentication credential 148 before granting full access to user interface 112, thereby ensuring that only authorized users can initiate or view processing operations.

With continued reference to FIG. 1, processor 104 is configured to detect, at user interface 112, a textual input 120 from a user. For the purposes of this disclosure, "textual input" is a digital character stream or linguistic entry generated through user actions into the interface. As a non-limiting example, the user actions may include typing, voice-to-text conversion, or pasting data. As a non-limiting example, textual input 120 may include chat prompts, command entries, form data, or messages composed by the user. As a non-limiting example, textual input 120 may include keystrokes 132, paste operations, and programmatic insertions from other applications. Processor 104 may buffer and may store textual input 120 in memory 108 for processing prior to external transmission.

With continued reference to FIG. 1, in some embodiments, detecting textual input 120 may include detecting a plurality of keystrokes 132 generated by the user and assembling the plurality of keystrokes 132 into textual input 120. For the purposes of this disclosure, "keystrokes" are discrete user input events corresponding to physical or virtual key activations on the user device 116. As a non-limiting example, keystrokes 132 may be intercepted through operating-system input buffers, browser APIs, or peripheral signal streams. In some embodiments, processor 104 may reconstruct textual input 120 in real time by concatenating sequential keystrokes 132 and monitoring their timing intervals to detect anomalies or paste operations. In some embodiments, processor 104 may register event listeners bound to input widgets of user interface 112 to receive low-level signals corresponding to keystrokes 132 (e.g., key-down, key-press, key-up), text-composition events from input method editors, and clipboard events indicating insertion of larger text spans. In some embodiments, processor 104 may timestamp each event, associate it with a caret position, and buffer the resulting characters in memory 108 to assemble a coherent textual input 120 while preserving ordering and line breaks. In some embodiments, processor 104 may maintain an input buffer in memory 108 to which individual keystroke 132 signals are appended as they are detected at user interface 112. Each keystroke 132 may include metadata such as the character code, timestamp, modifier key state, and cursor position. Processor 104 may order the keystrokes 132 according to their timestamps to preserve the chronological sequence of entry. In some embodiments, processor 104 may apply character encoding normalization (e.g., converting multi-byte or composed characters to a unified internal representation) to prevent inconsistencies across devices or operating systems. Processor 104 may monitor special control keystrokes 132 such as backspace, delete, enter, tab, and arrow keys, removing or overwriting corresponding characters within the input buffer as appropriate. When an enter or tab key is pressed, processor 104 may record a newline or delimiter character within textual input 120. In some embodiments, processor 104 may maintain a pointer representing the current cursor position so that inserted or deleted characters are applied to the correct location within the assembled string. In some embodiments, processor 104 may perform partial assembly during real-time input rather than waiting for final submission. For example, processor 104 may segment textual input 120 into tokens or words after detecting whitespace or punctuation and may trigger one or more processing schemes 136 to begin early identification of processing elements 144 such as names, numerical identifiers, or classified terms. In some embodiments, processor 104 may filter out non-text keystrokes 132 such as function keys or system shortcuts that do not contribute to textual input 120. Processor 104 may implement error correction logic based on key-event latency patterns or keyboard layout mappings to infer intended characters in cases of rapid or overlapping keystrokes 132. For example, and without limitation, if two keys are pressed nearly simultaneously, processor 104 may reference a dictionary of common typing sequences to determine probable order. In some embodiments, processor 104 may also detect input modality changes, such as voice-to-text conversion, handwriting recognition, or clipboard paste operations, and merge their outputs with the assembled keystrokes 132 to maintain a unified textual input 120 record. In some embodiments, processor 104 may normalize the buffered stream by applying character-encoding validation, converting heterogeneous newline conventions to a canonical form, removing non-printing control characters except those explicitly permitted (e.g., tab), and reconciling composition sequences (e.g., combining base characters and diacritics) to yield a stable intermediate form of textual input 120. Processor 104 may detect paste operations by inspecting event metadata such as payload length and source flags and may segment textual input 120 into tokens or spans to enable prompt invocation of one or more processing schemes 136 in a cascading sequence 140 without waiting for a final submit action. Processor 104 may implement debouncing or rate-limiting so that detection triggers when a boundary condition is met (e.g., pause in typing, sentence-ending punctuation, or size threshold), thereby balancing responsiveness with computational efficiency. Processor 104 may monitor edit operations such as backspace, delete, selection-replace, and undo/redo, and may update the buffered textual input 120 by applying the same transformations to the in-memory representation to keep it synchronized with user interface 112. In some embodiments, processor 104 may classify the detected textual input 120 by language and script, infer domain context from surrounding UI metadata (e.g., field label "account number" or "patient notes"), and record these attributes alongside the buffered content so downstream processing schemes 136 can prioritize relevant categories of processing elements 144. Processor 104 may expose a secure callback to user interface 112 to acknowledge successful detection (e.g., "input captured" signals) and, when policy requires, may temporarily suspend additional keystroke ingress while initial screening executes, then resume keystroke handling upon completion, ensuring that the detected textual input 120 analyzed in memory 108 corresponds exactly to what is displayed at user interface 112. In some embodiments, once textual input 120 has been assembled, processor 104 may generate a checksum or hash of the buffered text to ensure integrity before executing subsequent processing schemes 136. Processor 104 may then store the finalized textual input 120 within memory 108 for analysis by cascading sequence 140 of data-masking and classification operations.

With continued reference to FIG. 1, processor 104 is configured to execute a plurality of processing schemes 136 in a cascading sequence 140 to identify one or more processing elements 144 within textual input 120. For the purposes of this disclosure, "processing elements" are recognized text segments representing specific informational types within textual input. For the purposes of this disclosure, "processing schemes" are algorithmic or model-based analytic workflows for identifying or transforming textual information. As a non-limiting example, processing schemes 136 may include a named entity recognition (NER) scheme configured to identify entities such as names, addresses, phone numbers, government identification numbers, and organization names. In some embodiments, this NER scheme may include a transformer-based model trained on labeled datasets containing annotated sentences with corresponding entity classes. The model may receive tokenized textual input 120 and output entity tags for each token, enabling processor 104 to classify sequences like "John Smith" or "123-45-6789" as sensitive processing elements 144. In some embodiments, processing schemes 136 may further include a pattern matching scheme configured to identify structured data formats, such as credit card numbers, email addresses, or IP addresses. In such embodiments, the pattern matching scheme may employ regular expressions, deterministic finite automata, or rule-based heuristics. For example, processor 104 may detect a sequence of sixteen digits matching a Luhn checksum pattern and flag it as a payment identifier processing element 144. In some embodiments, processing schemes 136 may include a contextual sensitivity scheme configured to analyze the surrounding semantics of textual input 120 to determine whether a neutral term becomes sensitive within a particular context. As a non-limiting example, the term "disorder" following a person's name may indicate a medical context, triggering the scheme to classify the segment as a health-related processing element 144. In some embodiments, this scheme may incorporate contextual embeddings generated by a neural network trained on domain-specific corpora, enabling it to distinguish between benign and sensitive usage based on neighboring words. Processor 104 may also employ a language translation scheme configured to normalize multilingual textual input 120 into a canonical language prior to downstream filtering. For example, and without limitation, processor 104 may invoke a sequence-to-sequence translation model trained on bilingual parallel corpora to convert sensitive information written in another language into the base system language for consistent masking. In some embodiments, processor 104 may further employ a risk scoring scheme configured to evaluate the probability that a given phrase or sentence contains sensitive data based on learned statistical features. In such embodiments, the risk scoring scheme may use a gradient boosting classifier or neural attention model trained on labeled sensitivity scores derived from historical datasets. Processor 104 may then threshold the model output to determine whether additional masking should be applied. Additional processing schemes 136 may include syntactic parsing schemes to detect structured queries or commands, semantic similarity schemes to identify data rephrased across multiple segments, or obfuscation detection schemes trained to identify attempts to disguise sensitive content using character substitution or encoded text. In some embodiments, each processing scheme 136 may output a set of coordinates, indices, or token identifiers corresponding to detected processing elements 144, along with metadata indicating confidence scores and element categories. Processor 104 may then sequentially execute the next processing scheme 136 in cascading sequence 140, using the modified intermediate representation of textual input 120 as input to refine or expand detection accuracy.

With continued reference to FIG. 1, execution of a first processing scheme modifies textual input 120 to generate an intermediate representation and passes the intermediate representation to a subsequent processing scheme. As a non-limiting example, processor 104 can execute a first processing scheme 136 using rule-based pattern matching to detect structured identifiers, a second using a named-entity recognition network to detect person or organization names, and a third using contextual inference models to identify implied confidential phrases. For the purposes of this disclosure, an "intermediate representation" is a structured, machine-readable data format derived from a textual input after partial or complete processing by one or more processing schemes. The intermediate representation may serve as a transitional data state that encapsulates both the modified content and its associated metadata, such as annotations, classification tags, positional indices, and confidence scores, generated by prior processing schemes 136. The intermediate representation may ensure continuity between successive stages of analysis within cascading sequence 140 and may allow downstream processing schemes 136 to operate on a consistent, normalized, and enriched version of textual input 120. Processor 104 is configured to execute a first processing scheme 136 that modifies textual input 120 to generate an intermediate representation. The modification may include tagging sensitive entities, masking portions of detected processing elements 144, or appending metadata structures that describe the type, location, and confidence level of each detection. For example, and without limitation, if the first processing scheme 136 identifies a phone number within textual input 120, the intermediate representation may include a data object or token array in which the detected segment is replaced with a placeholder value (e.g., data mask 152) and linked to metadata specifying its category and the method of detection. In some embodiments, the intermediate representation may be implemented as a serialized document object model, token list, or feature map stored in memory 108. The intermediate representation may preserve token ordering and syntactic dependencies to ensure semantic consistency during further analysis. For instance, a named entity recognition scheme may first output a structured list of tokens annotated with entity labels and positional indices. This annotated list may become the intermediate representation, which may be then provided as input to a contextual sensitivity scheme configured to examine neighboring tokens to determine whether the detected entities carry additional privacy risk in context. In some embodiments, processor 104 may enrich the intermediate representation with multi-layer embeddings or vectorized features produced by deep learning models. These features may capture semantic meaning, entity relationships, or linguistic patterns that subsequent schemes can exploit for higher-order reasoning or reclassification. In certain embodiments, intermediate representations may include checksum or hash values to verify data integrity between stages, ensuring that the modifications performed by prior schemes are traceable and reversible if needed. In some embodiments, after generating the intermediate representation, processor 104 may pass it to a subsequent processing scheme 136 within cascading sequence 140. The subsequent processing scheme 136 may interpret the intermediate representation to perform additional transformations, such as re-evaluating masked entities for overlapping categories, refining boundaries of detected elements, or applying risk scoring models. For example, and without limitation, a second processing scheme 136 may receive the intermediate representation from a pattern matching scheme and further analyze the context surrounding detected numeric strings to differentiate between benign identifiers and sensitive identifiers. In some embodiments, the cascading execution of processing schemes 136 using intermediate representations may enable efficient, non-destructive data transformation, where each successive scheme incrementally refines textual input 120 without duplicating earlier computations. This stepwise propagation of intermediate representations allows apparatus 100 to integrate rule-based and machine-learning-based techniques within a unified processing pipeline, ensuring accuracy, modularity, and compliance with privacy protection requirements.

With continued reference to FIG. 1, each processing scheme 136 is configured to identify a particular category of processing element 144. for the purposes of this disclosure, a "category of processing element" is a defined class or type of processing elements that shares a common sensitivity characteristic, data format, or contextual meaning. Each category may represent a logical grouping of processing elements 144 that exhibit similar structural, lexical, or contextual features. As a non-limiting example, categories of processing elements 144 may include personally identifiable information (PII) such as names, phone numbers, and addresses; financial information such as credit card numbers, bank account identifiers, or payment tokens; health-related information such as medical conditions, prescriptions, or diagnostic codes; or business-confidential information such as trade secrets, contract terms, or project identifiers. In some embodiments, categories of processing elements 144 may include contextual or behavioral indicators such as login credentials, access tokens, or API keys, which are not directly human-readable but carry operational sensitivity. In some embodiments, processor 104 may maintain a taxonomy or schema that enumerates all supported categories of processing elements 144. Each category may be associated with metadata attributes defining its expected structure, permissible variations, corresponding detection models, and masking policies. For example, and without limitation, the category "financial identifiers" may include subtypes such as "credit card number," "routing number," and "IBAN," each with its own pattern templates and validation rules. The category "health information" may include subtypes such as "symptom description" and "diagnosis code," each requiring domain-specific named entity recognition models trained on medical corpora. In some embodiments, processor 104 may dynamically infer the applicable category for a detected token or phrase by aggregating results from multiple processing schemes 136. For instance, if both a pattern matching scheme and a contextual sensitivity scheme identify overlapping segments of textual input 120, processor 104 may resolve the overlap by selecting the category with the highest confidence score or applying a prioritization rule defined in cascading sequence 140. In some embodiments, categories of processing elements 144 may be extensible, allowing administrators to define new categories or modify existing ones through configuration files or policy updates, enabling adaptation to domain-specific regulatory or organizational requirements. In some cases, each processing scheme 136 may be configured to identify a particular category personally identifiable information (PII), financial identifiers, medical terminology, proprietary business data, or contextual risk indicators.

With continued reference to FIG. 1, for the purposes of this disclosure, a "cascading sequence" is an ordered series of processing schemes where each subsequent scheme receives the modified output of the preceding one. In some embodiments, processor 104 may execute plurality of processing schemes 136 in cascading sequence 140 by identifying contextual factors of textual input 120 as a function of detected processing elements 144, determining a processing order 156 of cascading sequence 140 based on those contextual factors, and executing the schemes accordingly. For the purposes of this disclosure, "processing order" is an operational prioritization scheme dictating execution sequence. As a non-limiting example, processor 104 may determine that personally identifiable information detectors should precede topic classifiers when privacy sensitivity is high. For the purposes of this disclosure, a "contextual factor" is an attribute, signal, or metadata element derived from a textual input, from its surrounding environment, or from prior detections of processing elements. A contextual factor may provide interpretive or situational information about textual input 120, allowing apparatus 100 to adapt its analysis dynamically based on input content, source, or purpose. As a non-limiting example, contextual factors may include linguistic indicators (e.g., detected language or script), domain indicators (e.g., medical, financial, or legal terminology), data density (e.g., concentration of numerical sequences), positional metadata (e.g., field labels such as "SSN," "Account Number," or "Diagnosis"), user role or authentication level, geographic or regulatory region, and interaction type (e.g., chatbot message versus email draft). In some embodiments, contextual factors may include runtime signals such as keystroke timing patterns, active application window identifiers, or device security states. In some embodiments, processor 104 may identify one or more contextual factors of textual input 120 as a function of the detected processing elements 144. For example, and without limitation, processor 104 may detect that textual input 120 contains both a person's name and a sequence resembling a financial identifier; based on this combination, processor 104 may infer that the input belongs to a financial context and assign a contextual factor indicating "financial transaction domain." Similarly, if detected processing elements 144 include terms such as "patient," "diagnosis," or "treatment," processor 104 may assign a contextual factor indicating "healthcare domain." These contextual factors may be stored as metadata associated with the intermediate representation of textual input 120 and used to drive subsequent decision-making regarding processing order 156 of cascading sequence 140. In some embodiments, processor 104 may determine a processing order 156 of cascading sequence 140 as a function of one or more contextual factors. For example, and without limitation, in a financial context, processor 104 may prioritize execution of pattern matching and number validation schemes early in cascading sequence 140 to quickly detect structured financial identifiers. Conversely, without limitation, in a healthcare context, processor 104 may prioritize semantic or contextual sensitivity schemes that rely on domain-specific NER models trained on medical text corpora. In some embodiments, processor 104 may compute a relevance score for each available processing scheme 136 based on its compatibility with the detected contextual factors and may sort or schedule the schemes accordingly. Processor 104 may also update processing order 156 dynamically if new contextual factors emerge during intermediate analysis, ensuring that downstream processing schemes 136 receive optimally filtered and contextualized input. In some embodiments, processor 104 may execute the processing schemes 136 according to the determined processing order 156 by iteratively passing the intermediate representation of textual input 120 from one scheme to the next. For example, and without limitation, if the contextual factor indicates "multilingual input," processor 104 may first execute a translation scheme to normalize textual input 120 into a canonical language before executing a contextual sensitivity or masking scheme. Alternatively, if the contextual factor indicates "numeric-heavy content," processor 104 may first execute pattern-based and checksum-validation schemes to capture numeric identifiers efficiently. In some embodiments, processor 104 may implement a scheduling module within memory 108 that maintains a prioritized queue of processing schemes 136 and dynamically adjusts execution flow based on observed contextual factors. The scheduling module may log each contextual factor detected, the sequence of applied schemes, and their performance metrics to improve future decision-making through adaptive learning. This allows apparatus 100 to achieve higher detection accuracy, reduce redundant computation, and ensure that the most contextually relevant processing schemes 136 are applied in an order that maximizes both efficiency and data protection fidelity.

With continued reference to FIG. 1, in some embodiments, processor 104 may determine processing order 156 as a function of computational efficiency metrics of the processing elements 144. As a non-limiting example, computational efficiency metrics of the processing elements 144 may include estimated runtime, memory cost, or confidence-to-latency ratio. Processor 104 may reorder schemes dynamically to minimize overall latency. For the purposes of this disclosure, "computational efficiency metrics" are quantitative measures that represent on an expected or observed computational performance of processing schemes. These metrics may characterize how efficiently each processing scheme 136 operates in relation to system resources, including time, memory, and processing power or contextual factor. Computational efficiency metrics may ensure that apparatus 100 optimizes its runtime behavior while maintaining high accuracy in detecting and masking processing elements 144. As a non-limiting example, computational efficiency metrics may include parameters such as execution latency, which represents the average or maximum time required for a processing scheme 136 to analyze a given length of textual input 120; memory footprint, which measures the amount of memory 108 consumed during scheme execution; and CPU or GPU utilization, which quantifies processor load associated with the scheme. Additional computational efficiency metrics may include throughput, defined as the number of characters or tokens processed per second; energy consumption, representing power usage during execution; and resource concurrency, indicating the degree to which the processing scheme 136 can parallelize tasks across multiple cores or threads. In some embodiments, processor 104 may determine processing order 156 of cascading sequence 140 as a function of the computational efficiency metrics of the processing elements 144. For example, processor 104 may prioritize schemes with lower average latency or smaller memory footprint to execute first, particularly when handling short or interactive textual input 120 such as keystrokes 132 captured in real time. In some embodiments, processor 104 may store a performance profile for each processing scheme 136, derived from empirical runtime statistics, and may use this profile to calculate a composite efficiency score representing expected computational cost under current system conditions. In some embodiments, processor 104 may dynamically adjust processing order 156 during execution if efficiency metrics change, such as when memory 108 usage exceeds a threshold or when real-time input rates increase. For example, and without limitation, if a contextual sensitivity scheme is determined to have high accuracy but high latency, processor 104 may delay its execution until faster, pattern-based schemes have completed preliminary filtering, thereby reducing the overall data volume passed downstream. Similarly, when multiple processing schemes 136 compete for resources, processor 104 may schedule or parallelize them based on their efficiency rankings to maintain consistent response times. In some embodiments, computational efficiency metrics may include adaptive learning parameters derived from historical system performance. Processor 104 may analyze prior execution logs to determine optimal sequencing under varying conditions, such as different input lengths, user interface 112 types, or device hardware configurations. By continuously updating efficiency models based on operational feedback, apparatus 100 may improve processing throughput while ensuring that sensitive data remains effectively filtered before reaching an external system 124.

With continued reference to FIG. 1, in some embodiments, processor 104 may receive a user authentication credential 148 from user interface 112 and may select one or more of the processing schemes 136 based on user authentication credential 148. For the purposes of this disclosure, a "user authentication credential" is a datum or set of data uniquely associated with a user or user device that serves to verify the identity or access level of the user. A user authentication credential 148 may represent identity information, authorization attributes, or privilege levels that determine which categories of processing schemes 136 are applicable for a given session. As a non-limiting example, user authentication credential 148 may include a username and password combination, biometric signature, digital certificate, or token-based identifier (e.g., an OAuth token or multi-factor authentication code). In some embodiments, processor 104 may receive user authentication credential 148 from the user device 116 through a secure transmission channel, such as an encrypted HTTPS session or a secure WebSocket connection integrated into user interface 112. Processor 104 may compare the received user authentication credential 148 against a set of authorized credentials stored within a credential verification database accessible through memory 108. Upon successful validation, processor 104 may establish a session context associated with the verified user identity and assign an authorization level. In some embodiments, the authorization level derived from user authentication credential 148 may dictate which processing schemes 136 are selected for execution. For example, and without limitation, a user with administrative privileges may enable advanced or high-sensitivity processing schemes 136 such as deep semantic analysis, cross-field correlation, or contextual reclassification schemes that inspect broader contextual dependencies. Conversely, a user with a standard privilege level may only invoke basic pattern matching and named entity recognition schemes to preserve processing efficiency while enforcing minimum privacy safeguards. In some embodiments, processor 104 may determine that certain categories of processing elements 144 are only relevant or permissible to analyze when user authentication credential 148 corresponds to a defined user role. For instance, and without limitation, when user authentication credential 148 indicates a compliance officer or firm administrator, processor 104 may activate schemes specialized for regulatory audit logging or metadata retention. When the credential indicates an end-user, processor 104 may limit execution to lightweight masking schemes to protect privacy during interactive communication. In some embodiments, processor 104 may dynamically adjust processing order 156 of cascading sequence 140 based on user authentication credential 148. For example, if a high-trust credential is detected, processor 104 may prioritize high-accuracy but computationally intensive schemes at the start of the sequence. Conversely, if a guest or temporary credential is identified, processor 104 may prioritize lower-latency or reduced-scope schemes first, ensuring efficient handling while maintaining compliance boundaries.

With continued reference to FIG. 1, in some embodiments, processor 104 may further regulate visibility of information based on user authentication credentials 148. For example, and without limitation, processor 104 may classify user authentication credentials 148 into priority levels such as low, medium, and high, each corresponding to distinct access privileges. A low-priority credential may permit only masked or sanitized textual input 120 to be displayed at user interface 112, whereas a high-priority credential may permit full visualization of detected processing elements 144 and corresponding data masks 152 for review or override. This selective access control ensures that only authorized users are permitted to view or modify sensitive data while apparatus 100 continues to enforce privacy compliance uniformly across all users. In some embodiments, this credential-based scheme selection may serve as an internal security measure for apparatus 100, allowing firms or administrators to configure data exposure and processing depth dynamically. For example, if a credential corresponds to a compliance administrator, processor 104 may display audit logs, flagged text segments, and sensitivity metrics in detail. If the credential corresponds to an end-client interacting with a chatbot or digital assistant, processor 104 may conceal metadata and display only sanitized textual input 120 and the corresponding AI output. This dynamic adaptability enables apparatus 100 to operate as both a compliance enforcement tool and a real-time privacy-preserving intermediary between users and artificial intelligence systems.

With continued reference to FIG. 1, processor 104 is configured to generate a processed textual input 128 by modifying each identified processing element 144 with one or more data masks 152. For the purposes of this disclosure, "data masks" are obfuscation patterns or replacement tokens applied to conceal sensitive portions of text while preserving semantic structure. As a non-limiting example, processor 104 can replace digits of a financial identifier with asterisks, substitute names with generic placeholders, or insert context-neutral symbols. Processor 104 may store processed textual input 128 in memory 108 for further analysis or routing. For the purposes of this disclosure, a "processed textual input" is a transformed version of a textual input that has undergone one or more operations by a plurality of processing schemes. In some cases, processed textual input 128 may represent a sanitized, filtered, or otherwise modified form of textual input 120 in which identified processing elements 144 have been masked, redacted, replaced, or annotated according to predefined data protection policies. In some cases, processed textual input 128 may serve as the final output of the privacy-screening process executed by processor 104 prior to routing content to an external system 124, such as a language model as described in detail below. In some embodiments, processed textual input 128 may include the same linguistic structure and general meaning as the original textual input 120 but excludes or obfuscates sensitive information. For example, and without limitation, if textual input 120 contains "My name is John Smith and my account number is 1234-5678-9012," processed textual input 128 may be represented as "My name is [REDACTED_NAME] and my account number is [MASKED_ACCOUNT]." In this example, processor 104 may have replaced the detected processing elements 144 (the name and account number) with data masks 152 that indicate their presence while preserving readability and grammatical integrity. In some embodiments, processed textual input 128 may include metadata tags or embedded markers that encode the location, type, and confidence level of each modification. Processor 104 may generate such metadata to enable auditability or selective reconstruction of redacted segments under authorized access. The metadata may be stored in memory 108 or appended as structured annotations in processed textual input 128 itself, depending on system configuration and privacy requirements.

With continued reference to FIG. 1, in some embodiments, the generation of processed textual input 128 may include the application of data masks 152 determined by a mask classifier, which may select appropriate masking formats (e.g., full redaction, token substitution, or pseudonymization) based on the category of the corresponding processing element 144. For example, and without limitation, a processing element 144 classified as a Social Security Number may be replaced by a fixed-length placeholder such as "XXX-XX-XXXX," whereas a processing element 144 classified as a person's name may be substituted with a generic label such as "[PERSON]." In some embodiments, processed textual input 128 may be formatted for downstream compatibility with external system 124. Processor 104 may reassemble the masked segments into a normalized textual sequence, ensuring that processed textual input 128 preserves semantic context for language model processing. For instance, processor 104 may ensure that syntactic dependencies, punctuation, and spacing are preserved after masking operations so that the resulting processed textual input 128 maintains coherence and can be meaningfully interpreted by an artificial intelligence system without disclosing private information. In some embodiments, processor 104 may display processed textual input 128 within user interface 112 alongside visual indicators, such as highlights, tooltips, or icons, corresponding to masked regions as described in detail below. These indicators may inform users of the redacted content's presence and classification without revealing the underlying sensitive data. In some embodiments, processed textual input 128 may also be stored temporarily within memory 108 or transmitted to a secure intermediary service for compliance logging, ensuring that any downstream data access or AI processing occurs only on fully sanitized inputs.

With continued reference to FIG. 1, in some embodiments, modifying each processing element 144 using corresponding data masks 152 may include determining the data masks 152 using a mask classifier 160 trained on mask training data. For the purposes of this disclosure, a "mask classifier" is a supervised or semi-supervised model mapping detected data types to optimal masking transformations. As a non-limiting example, mask classifier 160 may include a deep neural network trained on text-mask pairs containing social-security numbers, email addresses, or health identifiers. In some embodiments, processor 104 may retrain mask classifier 160 periodically using feedback collected from verified masking results to improve accuracy across evolving data domains.

With continued reference to FIG. 1, for the purposes of this disclosure, a "training dataset" is a structured collection of labeled or unlabeled records used to develop, refine, or validate machine-learning models within apparatus 100. A training dataset may include raw textual samples, annotated data masks, and metadata corresponding to contextual categories of processing elements 144. As a non-limiting example, a training dataset may contain textual entries with personally identifiable information, such as names, phone numbers, or financial identifiers, each labeled with a target masking pattern or categorical tag. In some embodiments, the training dataset may include synthetic data generated through augmentation techniques, such as random substitution, obfuscation, or paraphrasing, to improve generalization performance of mask classifier 160 and processing schemes 136.

With continued reference to FIG. 1, in some embodiments, processor 104 may generate or curate mask training data by aggregating anonymized textual samples across multiple user sessions and applying automated tagging pipelines to identify processing elements 144. For the purposes of this disclosure, "mask training data" is training data that is used to train a mask classifier. For example, and without limitation, processor 104 may tokenize textual input 120 into sentence units, match recognized patterns against regular-expression dictionaries, and flag potential sensitive strings as redaction targets. These tagged segments may then be paired with exemplary masking templates to form input-output pairs for training mask classifier 160. In some embodiments, the source of the mask training data may include synthetic datasets, curated real-world text corpora, and domain-specific annotated repositories, depending on the target application and compliance requirements. As a non-limiting example, an input of mask classifier 160 may include a set of data features or representations corresponding to the detected processing elements 144 and their contextual embeddings within the textual input 120. As a non-limiting example, an output of mask classifier may include a structured mapping between each detected processing element 144 and its corresponding data mask 152, along with a classification confidence score for each mapping.

With continued reference to FIG. 1, in some embodiments, mask classifier 160 may include one or more artificial intelligence models configured to predict an appropriate masking transformation for each detected processing element 144. As a non-limiting example, mask classifier 160 may include a convolutional neural network for character-level masking, a transformer encoder for contextual embedding analysis, or a gradient boosting tree model for categorical decision boundaries. Mask classifier 160 may output a mask token, replacement rule, or transformation specification corresponding to each input element. In some embodiments, processor 104 may train mask classifier 160 using a supervised learning framework where input vectors represent detected processing elements and target outputs represent pre-defined data masks 152.

With continued reference to FIG. 1, in some embodiments, processor 104 may implement a distributed training pipeline for mask classifier 160. The training pipeline may include preprocessing stages for normalization, vectorization, and augmentation of textual data, a learning stage for parameter optimization, and an evaluation stage for performance validation. As a non-limiting example, processor 104 may normalize textual samples by converting characters to Unicode embeddings, segmenting words using subword tokenization, and converting categorical tags into one-hot encoded vectors. The learning stage may apply stochastic gradient descent, Adam optimization, or adaptive learning-rate schedulers to minimize a categorical cross-entropy loss between predicted and true mask types. The evaluation stage may measure F1 score, precision, recall, or masking consistency to ensure the classifier generalizes beyond its training data.

With continued reference to FIG. 1, in some embodiments, processor 104 may implement a feedback retraining loop to adapt mask classifier 160 based on operational data collected during inference. The feedback loop may store misclassified or partially masked segments in a retraining queue and re-label them using verified correction data from expert users or human-in-the-loop validators. For example, and without limitation, if apparatus 100 detects a processing element 144 as a phone number but incorrectly applies an email-style mask, processor 104 may capture the correction and add it as a new training example. The retraining loop may execute periodically or continuously depending on system configuration.

With continued reference to FIG. 1, in some embodiments, each processing scheme 136 within cascading sequence 140 may include an individual machine-learning module trained for a distinct detection category. As a non-limiting example, a first scheme may include a pattern-based entity recognizer for structured identifiers, a second scheme may include a transformer-based context model for semantic inference, and a third scheme may include a sequence tagging network trained to label positional dependencies across sentences. Each processing scheme 136 may produce confidence scores, which processor 104 may aggregate to determine the likelihood that a given token corresponds to a processing element 144.

With continued reference to FIG. 1, for the purposes of this disclosure, a "sequence tagging network" is a supervised learning model that assigns categorical labels to ordered tokens in a sequence. As a non-limiting example, a sequence tagging network may include a bidirectional long short-term memory (BiLSTM) model coupled with a conditional random field (CRF) layer to maintain consistency of tag transitions across textual input 120. In some embodiments, processor 104 may train the sequence tagging network using labeled sequences where each token corresponds to an annotation such as "safe," "sensitive," or "maskable." The training objective may minimize a sequence-level loss function that penalizes incorrect tag transitions.

With continued reference to FIG. 1, in some embodiments, processor 104 may implement a cascading controller configured to determine the optimal execution order among processing schemes 136 based on operational feedback and contextual conditions. The cascading controller may store a dynamic priority matrix reflecting dependency relationships between schemes. For example, and without limitation, the cascading controller may determine that pattern-based detectors should precede semantic models to minimize false positives and reduce computation time. Processor 104 may update this matrix over time based on observed performance metrics, including latency, accuracy, and masking precision.

With continued reference to FIG. 1, in some embodiments, processor 104 may integrate a contextual inference module configured to evaluate the semantic meaning of textual input 120 before applying data masks 152. The contextual inference module may include an embedding generator trained on domain-specific corpora to understand associations between words and sensitive categories. For example, and without limitation, the module may learn that the term "account" followed by a sequence of digits is more likely to represent a financial identifier than a random number. The contextual inference module may output a contextual sensitivity score that influences which processing schemes 136 are activated in cascading sequence 140.

With continued reference to FIG. 1, in some embodiments, processor 104 may coordinate results between the contextual inference module and mask classifier 160 through an inter-model communication interface. The inter-model interface may aggregate confidence outputs, cross-validate predicted categories, and resolve conflicts when two models suggest overlapping masking actions. For example, and without limitation, if one model predicts a string as a name and another as an organization, the interface may evaluate probability distributions to select the higher-confidence prediction or apply multiple mask types.

With continued reference to FIG. 1, in some embodiments, processor 104 may evaluate performance of mask classifier 160 and processing schemes 136 using benchmarking datasets separate from the training corpus. These benchmarking datasets may include annotated test cases representing various sensitive information categories and contextual noise. Processor 104 may compute metrics such as false positive rate, false negative rate, average masking latency, and model drift percentage. The evaluation results may be stored in memory 108 and used for version control of model updates.

With continued reference to FIG. 1, in some embodiments, user authentication credential 148 may influence which models are deployed or activated at runtime. For example, and without limitation, authenticated administrative users may gain access to higher-complexity models that provide stronger masking and detailed audit logs, while unauthenticated guest users may interact with lightweight models optimized for low latency. Processor 104 may store credential-based policies in memory 108, linking access privileges to model configurations and cascading sequence 140 execution modes.

With continued reference to FIG. 1, in some embodiments, processor 104 may manage an adaptive inference workflow, wherein intermediate results from one processing scheme 136 are used to fine-tune input embeddings for subsequent schemes. As a non-limiting example, output embeddings from a contextual inference module may be concatenated with token-level probability distributions from a named-entity recognition model to form richer composite features. These features may be provided to mask classifier 160 to produce higher-precision masking decisions.

With continued reference to FIG. 1, in some embodiments, processor 104 may support multimodal training and inference to extend redaction capabilities beyond textual inputs. The training dataset may include visual-text pairs, such as screenshots or scanned documents containing textual elements. Processor 104 may use optical character recognition modules to convert visual elements into textual input 120 and then apply the same cascading sequence 140 for redaction. This integration may allow apparatus 100 to handle diverse data sources while maintaining uniform privacy protection.

With continued reference to FIG. 1, in some embodiments, processor 104 may log and audit every masking action for compliance verification. The audit log may include timestamps, identified processing elements 144, applied mask types, and contextual confidence levels. This information may be used to train secondary models for anomaly detection to detect unintentional exposure of sensitive elements or misapplied masks.

With continued reference to FIG. 1, for the purposes of this disclosure, an "anomaly detection module" is a computational model configured to detect unusual or inconsistent redaction behaviors by analyzing log patterns. As a non-limiting example, an anomaly detection module may include an autoencoder trained on normal masking logs to identify deviations from standard behavior. When an anomaly is detected, processor 104 may trigger an alert or automatically reprocess the affected textual input 120 through additional filtering layers.

With continued reference to FIG. 1, in some embodiments, processor 104 may employ reinforcement learning techniques to dynamically optimize redaction strategies. Processor 104 may define reward functions based on successful prevention of sensitive leakage and minimal semantic distortion in processed textual input 128. For example, and without limitation, apparatus 100 may assign positive reward values when processed textual input 128 achieves high privacy protection with low meaning loss and penalize overmasking that reduces intelligibility.

With continued reference to FIG. 1, in some embodiments, processor 104 may coordinate retraining of all models within cascading sequence 140 through a centralized orchestration scheduler. The scheduler may manage model versions, dependencies, and data provenance to ensure consistency across retraining cycles. For example, and without limitation, when mask classifier 160 is retrained using new examples, the contextual inference and sequence tagging models may also be updated to maintain alignment between their learned feature spaces.

With continued reference to FIG. 1, in some embodiments, all model parameters, embeddings, and configuration states may be stored in memory 108 or in secure external databases. Memory 108 may include encryption mechanisms to protect model weights and prevent unauthorized extraction. Processor 104 may periodically back up model states and configurations to ensure redundancy and recovery capability.

With continued reference to FIG. 1, processor 104 is configured to continue executing plurality of processing schemes 136 in cascading sequence 140 on processed textual input 128 until no further processing elements 144 are identified. Processor 104 may determine completion when all processing schemes 136 in cascading sequence 140 report no unmasked element above a threshold confidence level. For the purposes of this disclosure, "completion" of cascading sequence 140 refers to a terminal condition wherein each processing scheme within the sequence has been executed in its defined order, and the cumulative analysis yields no additional unmasked or newly detected processing elements 144 above a predefined confidence threshold. In some embodiments, processor 104 may track the progression of each processing scheme 136 through an execution state table stored in memory 108. The execution state table may record, without limitation, the current scheme index, its associated output confidence distribution, the number of processing elements 144 detected in each iteration, and any corresponding data masks 152 applied to processed textual input 128. Processor 104 may compare the current state of processed textual input 128 against its prior iteration to determine whether any modifications occurred. If no new data masks 152 have been added and the confidence values for potential detections fall below the minimum threshold, processor 104 may classify the process as converged and terminate further cascading execution. In some embodiments, each processing scheme 136 in cascading sequence 140 may output a structured response including one or more of: a list of candidate processing elements 144, corresponding confidence scores, positional indices within processed textual input 128, and applied transformation types (e.g., redaction, replacement, annotation). Processor 104 may aggregate these outputs to determine whether subsequent schemes should be executed. For example, and without limitation, if the entity recognition scheme produces a confidence map showing no tokens exceeding the detection threshold, processor 104 may skip subsequent dependent schemes such as pattern-based validation or cross-field correlation, thereby optimizing computational efficiency.

With continued reference to FIG. 1, in some embodiments, processor 104 may implement a recursive evaluation loop in which processed textual input 128 is continuously re-analyzed after each scheme execution. The recursive evaluation may include verification passes, where intermediate outputs are re-fed into the first scheme to ensure no secondary or contextually inferred processing elements 144 remain undetected. For instance, and without limitation, if a first scheme identifies and masks an address, a subsequent pass may enable a contextual correlation scheme to detect a nearby postal code pattern that was not previously recognized due to dependency on masked context. Once this refinement cycle stabilizes, processor 104 may finalize processed textual input 128 as complete. In some embodiments, completion may further depend on a confidence aggregation model that combines outputs from multiple schemes. Processor 104 may use probabilistic fusion, weighted averaging, or ensemble voting mechanisms to compute an overall certainty score for processed textual input 128. When the composite confidence score indicates that remaining unmasked tokens have a probability below a preconfigured detection confidence (for example, 0.2 or 20%), processor 104 may finalize processing. Conversely, if any unmasked segments exhibit uncertainty or ambiguous classification, processor 104 may invoke additional schemes or fallback models trained to resolve edge cases. In some embodiments, processor 104 may log all iteration states during cascading execution to a traceable audit record in memory 108 or a secure database. This log may include scheme identifiers, detection counts per iteration, timestamps, and total runtime. Such logs enable post hoc validation of data sanitization completeness and support regulatory or compliance verification of masking integrity. In some embodiments, the termination condition of cascading sequence 140 may also be dynamically adjustable. For example, and without limitation, processor 104 may adjust the completion threshold based on contextual factors 164, such as the sensitivity of the detected data category or the privilege level associated with user authentication credential 148. For a high-sensitivity context, such as health or financial data, processor 104 may enforce a stricter completion criterion requiring full semantic masking, whereas for low-sensitivity inputs, processor 104 may conclude processing earlier to improve response latency.

With continued reference to FIG. 1, once no further processing elements 144 are identified, processor 104 is configured to route processed textual input 128 to an external system 124 for further processing and is configured to display processed textual input 128 at user interface 112. For the purposes of this disclosure, an "external system" is any computing environment separate from apparatus that consumes processed text. As a non-limiting example, external system 124 may include a generative artificial intelligence service, a remote application programming interface endpoint, or a cloud-hosted language model. Processor 104 can transmit processed textual input 128 using encrypted channels and render the masked result for user confirmation.

With continued reference to FIG. 1, in some case, external system 124 may include a language model. For the purposes of this disclosure, a "language model" is a computational system, algorithm, or ensemble of machine learning architectures that generate or process linguistic elements. Language model may be implemented within or as part of external system 124 and may be configured to perform natural language understanding, reasoning, and generation tasks in accordance with learned linguistic and contextual patterns derived from training data. In some cases, language model may include a large language model (LLM). A "large language model," as used herein, is a deep learning data structure that can recognize, summarize, translate, predict and/or generate text and other content based on knowledge gained from massive datasets. In some embodiments, language model may include a neural network architecture trained on large corpora of textual data to learn probabilistic representations of language. For example, and without limitation, language model may comprise a transformer-based model architecture (such as GPT, BERT, T5, or similar frameworks) employing attention mechanisms to capture semantic dependencies between words, phrases, and contextual embeddings. Language model may process processed textual input 128 as a sequence of tokens or embeddings and generate a response by computing conditional probabilities over possible continuations or structured outputs. In some embodiments, language model may include multiple submodules such as an encoder, a decoder, and a contextual embedding layer. The encoder may transform processed textual input 128 into high-dimensional vector representations that capture semantic meaning, while the decoder may iteratively generate the response token by token, conditioned on both the encoded representations and the model's internal attention state. In some embodiments, processor 104 may transmit processed textual input 128 to external system 124 through a secure communication interface (e.g., an API endpoint, encrypted network socket, or message queue), ensuring that no unprocessed or unmasked data is included in the transmitted payload.

With continued reference to FIG. 1, for the purposes of this disclosure, a "response" is an output datum or structured message generated by language model. In some embodiments, response may include, without limitation, natural-language text, structured data, commands, or contextual recommendations. The response may be transmitted from external system 124 back to apparatus 100 or directly rendered to the user through user interface 112. In some embodiments, response may depend on the type or intent of processed textual input 128. For example, and without limitation, if processed textual input 128 includes a masked query such as "What is my [REDACTED] number?" language model may generate a general response advising the user to avoid sharing sensitive identifiers. If processed textual input 128 includes a neutral query such as "What is the capital of France?", language model may generate a factual textual response such as "The capital of France is Paris." In this way, apparatus 100 ensures that only sanitized, privacy-compliant data is transmitted for inference while preserving the language model's normal operation and accuracy. In some embodiments, language model may include or interface with post-processing modules configured to refine or validate the generated response. Processor 104 or another supervisory module within apparatus 100 may verify that the response does not contain reflections or reconstructions of any previously masked data by executing additional processing schemes 136 prior to display.

With continued reference to FIG. 1, in some embodiments, language model may be trained using supervised, unsupervised, or reinforcement learning paradigms. The training data may include diverse natural-language corpora encompassing general text, domain-specific content, or dialogue datasets. In a non-limiting example, supervised fine-tuning data may pair input prompts with ideal responses curated by human reviewers to align model behavior with desired use cases. Reinforcement learning from human feedback (RLHF) may further refine model outputs to improve safety, helpfulness, and compliance with privacy guidelines. In some embodiments, apparatus 100 may include adaptive routing logic allowing processor 104 to select between multiple external systems 124, each hosting distinct language models optimized for different domains (e.g., healthcare, finance, education). Processor 104 may select the appropriate language model based on contextual factors 164 inferred from processed textual input 128, such as topic classification, user authentication credential 148, or sensitivity level.

With continued reference to FIG. 1, in some embodiments, processor 104 may suspend keystroke processing at user interface 112 upon identifying one or more processing elements 144 and may resume the keystroke processing when no further elements are detected. In some embodiments, suspension may include halting propagation of input events to the interface layer to prevent leakage during masking. For the purposes of this disclosure, a "keystroke processing" is the computational operation to capture, interpret, manage, and respond to discrete keystroke events generated by a user through a user interface on a user device. Keystroke processing encompasses the entire lifecycle of a keystroke event, from its detection at the hardware or virtual input layer, through its buffering and assembly into textual input 120, to its integration within apparatus's data handling and privacy filtering pipeline. In some embodiments, keystroke processing 168 may include detecting individual key-down, key-press, and key-up signals, timestamping those signals, and mapping them to corresponding character codes or symbolic representations based on the active keyboard layout and input method. Processor 104 may use an input listener or event capture mechanism bound to user interface 112 to receive these keystroke events in real time. Each captured event may be temporarily stored in an input buffer within memory 108, where processor 104 may maintain an ordered sequence of recent keystrokes 132 to assemble coherent textual input 120. In some embodiments, keystroke processing 168 may include contextual interpretation of input behavior. For example, and without limitation, processor 104 may identify typing speed, inter-key intervals, and correction patterns (e.g., use of backspace or delete keys) to distinguish between continuous typing and paste operations. Processor 104 may further recognize special keystrokes 132 such as enter, tab, or escape as control signals that delimit textual boundaries or trigger processing scheme 136 execution. In some embodiments, keystroke processing 168 may include input normalization operations. Processor 104 may convert raw keycodes into Unicode characters, resolve composition sequences (such as accented or multi-byte characters), and ensure consistent encoding formats across platforms. Processor 104 may also remove invalid control characters, normalize whitespace, and apply case handling rules to ensure uniform input representation.

With continued reference to FIG. 1, in some embodiments, processor 104 may manage suspension and resumption of keystroke processing 168 in coordination with privacy filtering. For example, and without limitation, when one or more redacting elements or processing elements 144 are detected during input assembly, processor 104 may suspend keystroke processing 168 to prevent further user input from propagating to memory 108 or external system 124. After sanitization and confirmation of processed textual input 128, processor 104 may resume keystroke processing 168 at user interface 112, allowing new input to be received. This ensures that sensitive information is contained and masked before additional data entry resumes. In some embodiments, keystroke processing 168 may incorporate AI-assisted monitoring and predictive correction models. Processor 104 may execute trained machine-learning models that classify sequences of keystrokes 132 for contextual prediction, such as detecting whether the user is entering personal identifiers, structured numbers (e.g., credit card formats), or named entities. Such predictive capabilities may trigger early invocation of processing schemes 136 in cascading sequence 140 to proactively prevent transmission of sensitive information. In some embodiments, processor 104 may log keystroke processing 168 metrics, including event frequency, latency between input capture and processing, and suspension intervals. These metrics may contribute to computational efficiency monitoring and performance optimization, ensuring that privacy filtering occurs without perceptible delay to the user.

With continued reference to FIG. 1, in some embodiments, suspending and resuming keystroke processing may include locking and unlocking a text input field of user interface 112. As a non-limiting example, processor 104 may temporarily gray out the entry field or display a security prompt while masking completes, then restore full editing capability. For the purposes of this disclosure, a "text input field" is a graphical or programmatic region within a user interface that is configured to receive, display, and temporarily store user-entered input. The text input field may function as the primary interface element through which the user interacts with apparatus 100 to provide freeform or structured text data for subsequent processing by processor 104. In some embodiments, a text input field may be implemented as a software component of a graphical user interface (GUI), web interface, or mobile application environment. It may correspond to a standard input widget, a text box in a desktop application, or an editable component of a chat interface. The text input field may be bound to event listeners that transmit keystroke events, composition updates, or paste actions to processor 104 for assembly into textual input 120. In some embodiments, the text input field may include metadata properties that describe its purpose or data classification context. For example, and without limitation, a text input field may be labeled with descriptors such as "name," "email," "account number," "address," or "chat message," each of which may influence how processor 104 applies specific processing schemes 136 within cascading sequence 140. These metadata tags may be programmatically accessible to processor 104 through document object models (DOM), accessibility trees, or application programming interfaces (APIs), enabling apparatus 100 to infer semantic meaning and adjust privacy filtering accordingly.

With continued reference to FIG. 1, in some embodiments, processor 104 may dynamically lock or unlock the text input field to control data entry. When one or more processing elements 144 are identified within textual input 120, processor 104 may lock the text input field by disabling its input handler, preventing the user from entering or modifying text until sanitization and revalidation are complete. Once processor 104 determines that processed textual input 128 contains no further processing elements 144, it may unlock the text input field to resume keystroke processing 168. This locking mechanism ensures that sensitive data is not transmitted or altered mid-analysis, preserving both security and input integrity.

With continued reference to FIG. 1, in some embodiments, the text input field may be visually augmented to assist user awareness and interaction. For example, and without limitation, when processor 104 applies a data mask 152 to a detected processing element 144, the corresponding segment of processed textual input 128 may be displayed in the text input field with a highlight, placeholder label, or symbol (e.g., "[MASKED]" or "[REDACTED]"). Processor 104 may also trigger contextual tooltips or alert banners within user interface 112 to inform the user that certain content has been sanitized in compliance with privacy rules. In some embodiments, the text input field may support multi-modal or hybrid input. For instance, and without limitation, it may receive both keyboard keystrokes 132 and speech-to-text input, handwriting recognition results, or clipboard-paste data. Processor 104 may normalize all such inputs into consistent textual input 120 prior to processing.

With continued reference to FIG. 1, in some embodiments, displaying processed textual input 128 and/or textual input 120 at user interface 112 may include highlighting or color-coding masked portions corresponding to the processing elements 144. In some embodiments, visual indicators may include shaded overlays, symbol placeholders, or warning icons. As a non-limiting example, apparatus 100 may render masked digits in gray while displaying contextually safe text in standard color, allowing user verification of redaction prior to submission.

With continued reference to FIG. 1, in some embodiments, processor 104 may log operational metadata including timestamps, confidence values, and performance statistics for each processing scheme 136 within cascading sequence 140. Such metadata may be used to refine processing order 156 decisions, retrain mask classifier 160, or evaluate efficiency improvements over time. As a non-limiting example, processor 104 may determine that contextual models outperform keyword detectors for specific domains and update processing order 156 accordingly during subsequent executions.

With continued reference to FIG. 1, in some embodiments, processor 104 may generate one or more graphical user interface elements at user interface 112 to display processed textual input 128. For the purposes of this disclosure, a "graphical user interface element" is a rendered component that presents text, icons, or symbols allowing human interaction and visualization of data masking results. As a non-limiting example, the graphical user interface element may include a text field, dialogue box, sidebar panel, or interactive modal window where both the original textual input 120 and processed textual input 128 are visually represented.

With continued reference to FIG. 1, in some embodiments, user interface 112 may include two synchronized display regions: a first region presenting the unprocessed textual input 128 in a secure, non-editable preview state, and a second region displaying processed textual input 128 with all data masks 152 applied. Processor 104 may synchronize both regions in real time so that each modification in processed textual input 128 corresponds to a visually identifiable masking event in the same positional alignment as the original input.

With continued reference to FIG. 1, in some embodiments, apparatus 100 may include a visual highlighting module configured to provide visual indicators corresponding to the one or more processing elements 144 identified within textual input 120. The visual highlighting module may color-code or annotate specific segments of processed textual input 128 to indicate the classification of each processing element 144. As a non-limiting example, personally identifiable information may be displayed in a light red shade, financial data may be shown in blue, and organizational names may be presented in green. Processor 104 may dynamically update these color assignments based on configurable user or administrative preferences stored within memory 108.

With continued reference to FIG. 1, for the purposes of this disclosure, a "visual indicator" is a graphical or visual element that conveys to a user information. The visual indicator may function as a feedback mechanism to inform the user that apparatus 100 has executed one or more processing schemes 136 in cascading sequence 140 and that privacy filtering or data masking operations have occurred. In some embodiments, a visual indicator may include, without limitation, color highlighting, underlining, shading, strikethroughs, icons, brackets, tooltips, or replacement symbols rendered over or adjacent to the affected text segments. Processor 104 may apply these visual indicators to corresponding locations within the text input field to maintain spatial correspondence between the user's original textual input 120 and the resulting processed textual input 128. In some embodiments, processor 104 may determine the type and intensity of the visual indicator as a function of the category of processing element 144 and the corresponding data mask 152 applied. For example, and without limitation, high-sensitivity data such as social security numbers may be displayed as fully masked placeholders (e.g., "[REDACTED]"), whereas moderate-sensitivity data such as personal names may be softly blurred or color-highlighted. Processor 104 may retrieve visualization parameters from configuration data stored in memory 108, where each processing element category is associated with a specific indicator style to maintain consistency and compliance with privacy guidelines. In some embodiments, a visual indicator may include interactive affordances. For example, and without limitation, processor 104 may render tooltips or pop-up messages when a user hovers over or taps a masked element, revealing metadata about the type of masking applied (e.g., "email address masked for privacy") without exposing the underlying sensitive data. In some embodiments, processor 104 may provide user-selectable options, such as "request unmask," "view redaction reason," or "report incorrect masking", where permitted by policy and authentication level.

With continued reference to FIG. 1, in some embodiments, visual indicators may be dynamically updated in real time as processor 104 continues executing plurality of processing schemes 136. For example, and without limitation, when a downstream processing scheme 136 identifies an additional processing element 144 within a previously unmasked portion of text, processor 104 may update the visual indicator by applying an additional color overlay or icon, signifying that deeper sanitization has occurred. Similarly, when no further processing elements 144 are detected, processor 104 may modify or remove transient visual indicators to confirm that processed textual input 128 is complete and safe for transmission to external system 124. In some embodiments, processor 104 may control visual indicator rendering through a graphical rendering module or a document object model (DOM) controller within user interface 112. The graphical rendering module may translate positional indices and metadata of detected processing elements 144 into pixel coordinates, layer identifiers, or vector shapes corresponding to the visual indicators. This ensures accurate alignment and consistent visual presentation across different screen resolutions, user devices 116, and interface frameworks. In some embodiments, the visual indicator may further serve as a diagnostic and auditing aid. Processor 104 may log instances of visual indicator generation along with associated processing schemes 136 and data masks 152 into a privacy audit log stored in memory 108. This log may enable system administrators or compliance reviewers to verify which text portions were flagged, masked, or modified, providing traceability and accountability in sensitive data handling.

With continued reference to FIG. 1, in some embodiments, apparatus 100 may render additional graphical icons, warning indicators, or status banners within user interface 112 to communicate the redaction process state. For example, and without limitation, apparatus 100 may display a "Masking in Progress" banner when processor 104 identifies one or more processing elements 144 and may display a "Ready for Transmission" status indicator when cascading sequence 140 completes and no further elements remain unmasked. These indicators may be accompanied by animation effects or textual prompts to improve user awareness of data security status.

With continued reference to FIG. 1, in some embodiments, user interface 112 may include user interaction components that allow manual override or feedback submission. The user may provide explicit confirmation that the displayed processed textual input 128 is satisfactory before transmission to external system 124. As a non-limiting example, the user may click a confirmation button, press a specific key sequence, or select a contextual menu option to authorize the routing of processed textual input 128. Processor 104 may interpret this confirmation as a secure transmission signal and initiate routing to external system 124 through encrypted communication channels.

With continued reference to FIG. 1, in some embodiments, processor 104 may provide interactive tooltips or floating annotation windows when the user hovers over or clicks on masked segments of processed textual input 128. The tooltips may display contextual information about the type of redaction performed, the confidence score of the masking action, and the originating processing scheme 136 that detected the element. As a non-limiting example, a tooltip for a masked phone number may indicate "Sensitive Data Type: Contact Information (Confidence: 96%)—Masked by Processing Scheme #1."

With continued reference to FIG. 1, in some embodiments, processor 104 may support audit and review workflows within the graphical user interface. User interface 112 may include a toggle control that allows authorized users to view side-by-side comparisons of textual input 120 and processed textual input 128. Access to this toggle may be restricted by user authentication credential 148 verification to prevent exposure of unmasked data to unauthorized parties.

With continued reference to FIG. 1, in some embodiments, processor 104 may display a progress bar or incremental status indicator that visually represents the sequential execution of cascading sequence 140. Each segment of the progress indicator may correspond to one of plurality of processing schemes 136, and completion of each scheme may be visually marked with a check symbol or color transition. This real-time feedback may allow the user to understand which categories of processing elements 144 have been identified and masked during runtime.

With continued reference to FIG. 1, in some embodiments, processor 104 may generate a post-processing summary window at user interface 112 after routing processed textual input 128 to external system 124. The summary window may list key metadata such as the number of redacted elements, masking categories, and cumulative processing time. For example, and without limitation, the summary may display "5 sensitive entities redacted (3 names, 1 phone number, 1 address)—Processing Time: 2.3 seconds." Such summaries may be stored in memory 108 for audit and traceability purposes.

With continued reference to FIG. 1, in some embodiments, processor 104 may adapt the appearance and functionality of user interface 112 based on device type or operating environment. For example, and without limitation, when the user device 116 is a mobile terminal, the graphical interface may present condensed layouts or sliding panels to conserve screen space, whereas when operating on a desktop computer, a full split-screen view may be provided. Processor 104 may detect the display resolution and input modality of the user device 116 to dynamically scale graphical components.

With continued reference to FIG. 1, in some embodiments, processor 104 may employ graphical rendering frameworks or browser-based libraries to implement the graphical user interface. As a non-limiting example, user interface 112 may be constructed using HTML and JavaScript for browser extensions or using cross-platform UI toolkits such as React Native, Qt, or Electron for native applications. The rendering layer may synchronize with underlying event listeners managed by processor 104 to display updates in near real time as cascading sequence 140 operates.

With continued reference to FIG. 1, in some embodiments, processor 104 may provide additional auditory or haptic feedback through the user device 116 when masking events occur. For example, and without limitation, a short vibration or auditory tone may accompany the activation of a data mask 152, alerting the user that a sensitive element has been redacted. Such multimodal cues may enhance user awareness in accessibility-oriented configurations or for visually impaired users.

With continued reference to FIG. 1, in some embodiments, user interface 112 may provide accessibility features compliant with international accessibility standards. Processor 104 may render enlarged text, high-contrast modes, or screen reader annotations describing masked elements. For example, and without limitation, a masked element may be read aloud as "Sensitive information hidden for privacy" rather than pronouncing the underlying text.

With continued reference to FIG. 1, in some embodiments, processor 104 may enable collaboration or supervisory review features within user interface 112. User interface 112 may support role-based access controls, wherein administrative reviewers may view both masked and unmasked versions of textual input 120 for auditing, while standard users may only view processed textual input 128. Processor 104 may enforce these access distinctions using user authentication credential 148 and may display watermark overlays to identify authorized users during review.

With continued reference to FIG. 1, in some embodiments, processor 104 may integrate user feedback mechanisms directly into the graphical interface. User interface 112 may include a "Report Masking Error" button or contextual menu allowing users to flag incorrect or excessive masking actions. These reports may be collected into apparatus 100's feedback module and subsequently used as retraining data for mask classifier 160, improving future masking precision and recall.

With continued reference to FIG. 1, in some embodiments, processor 104 may transmit the finalized processed textual input 128 from user interface 112 to external system 124 using encrypted channels. Encryption may include Transport Layer Security (TLS) or equivalent protocols ensuring end-to-end confidentiality. Processor 104 may additionally append transmission metadata such as anonymized session identifiers, masking metrics, and authorization tokens to facilitate secure communication with external system 124.

With continued reference to FIG. 1, in some embodiments, processor 104 may retrieve responses from external system 124 and display them at user interface 112 in conjunction with processed textual input 128. As a non-limiting example, external system 124 may include a language model that generates a contextual response. The response may be displayed within the same dialogue panel, and processor 104 may optionally mask any sensitive data that appears in the returned text, ensuring bidirectional data protection.

With continued reference to FIG. 1, in some embodiments, apparatus 100 may store all graphical display states, user interaction logs, and system responses in memory 108 for long-term audit and compliance validation. Stored states may include snapshots of user interface 112 configurations, masking color maps, and user confirmation timestamps. Processor 104 may periodically encrypt and back up this information to external storage for secure recordkeeping.

With continued reference to FIG. 1, in some embodiments, processor 104 may provide adaptive user interface personalization based on historical user behavior. For example, and without limitation, if a user frequently approves a particular mask type without review, processor 104 may reduce confirmation prompts for that category in subsequent sessions. Apparatus 100 may apply reinforcement learning or statistical weighting models to optimize user experience while maintaining compliance thresholds.

With continued reference to FIG. 1, in some embodiments, apparatus 100 may include an interface configuration module configured to manage layout templates, color palettes, font choices, and accessibility options for user interface 112. Processor 104 may retrieve these templates from memory 108 and render them dynamically based on device capabilities and authenticated user profiles.

With continued reference to FIG. 1, in some embodiments, processor 104 may execute privacy analytics at the graphical user interface level to estimate residual exposure risk after masking. The privacy analytics module may compute entropy or information gain values based on the masked textual input 120 and highlight sections that still pose a potential reidentification risk. As a non-limiting example, apparatus 100 may display a message stating "Residual risk: 2.5%—Low" next to the processed text field.

With continued reference to FIG. 1, the apparatus 100 described herein provides a technical solution to the technical problem of inadvertent exposure of sensitive information during user interactions with artificial intelligence systems and digital communication platforms. The technical problem arises when textual input 120 containing personally identifiable information (PII), protected health information (PHI), or confidential business data is transmitted to external systems, such as cloud-based language models, without prior sanitization, leading to potential data leakage, compliance violations, and security breaches. The disclosed apparatus 100 resolves this problem through a hardware-implemented, processor-driven privacy control mechanism that operates locally on a user device 116, thereby preventing unfiltered data from ever leaving the secure computing environment. Processor 104, in conjunction with memory 108, is configured to intercept and analyze textual input 120 at the point of generation within the user interface 112, before network transmission, to identify and mask sensitive processing elements 144 using a structured, cascading sequence 140 of processing schemes 136. This technical architecture ensures that multiple detectors can operate sequentially without overwriting or corrupting each other's results, addressing known computational conflicts in parallel pattern recognition pipelines. The system's capability to suspend and resume keystroke processing 168 further enhances real-time control over user input handling, thereby reducing latency and avoiding redundant reprocessing. The integration of a trained mask classifier 160 provides a machine learning-based layer of semantic understanding that accurately differentiates between benign and sensitive data, ensuring precision and recall beyond what rule-based filters alone can achieve. In addition, by routing sanitized data through zero-data-retention external systems 124, the apparatus 100 enforces a closed-loop data handling process that eliminates persistence risks in third-party AI providers. The overall design, comprising modular local processing, adaptive masking logic, user authentication-based configuration, and dynamic graphical feedback using visual indicators, constitutes a concrete, technological improvement to the way user-generated data is filtered, managed, and transmitted in AI-integrated applications. This approach not only mitigates the risk of data leakage but also improves computational efficiency and system reliability, providing a robust technical safeguard for secure, compliant, and privacy-preserving interaction between human users and artificial intelligence systems.

Figure 2:
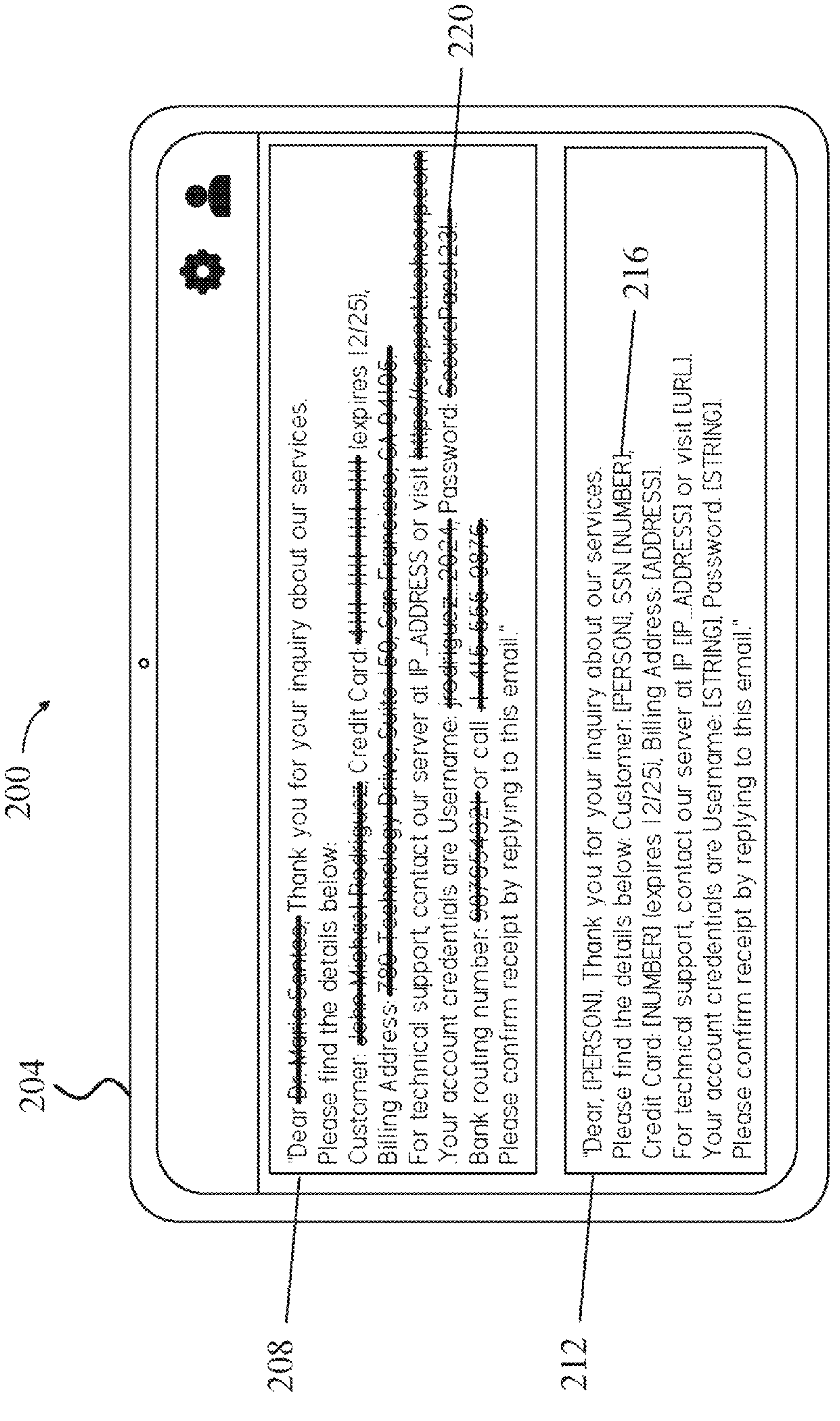
FIG. 2 illustrates an exemplary user interface.

Referring now to FIG. 2, an exemplary user interface 200 is illustrated. The user interface 200 may be displayed on a user device 204, which may include, without limitation, a laptop, desktop computer, tablet, smartphone, or other computing device capable of rendering graphical content and accepting user input. In some embodiments, the user device 204 may include a touchscreen, keyboard, or other input peripherals configured to capture user interaction events, such as keystrokes or pointer selections. In some cases, user interface 200 may include a textual input 208 and a processed textual input 212. The textual input 208 may display sensitive content, such as personally identifiable information, financial data, or credential information, before being processed by one or more processing schemes. The textual input 208 may be captured locally within a secure browser environment or an application window, where keystroke events are intercepted by the processor 104 as part of a data protection workflow. In some embodiments, the processed textual input 212 may display corresponding data masks 216 applied to replace redacted or obfuscated elements of the textual input 208. In some cases, data mask 216 may include a placeholder token (e.g., [PERSON], [NUMBER], [ADDRESS], [STRING]) that preserves structural alignment and readability while concealing sensitive content. In some embodiments, the user interface 200 may include a visual indicator 220 to signal the location, type, or severity of each redacted element. As a non-limiting example, visual indicator 220 may include underlining, highlighting, strike-through text, or a color-coded annotation (e.g., yellow for pending review, gray for confirmed masking). In some embodiments, visual indicator 220 may further include a tooltip or hover message explaining the category of the masked data or the rationale for redaction.

Figure 3:
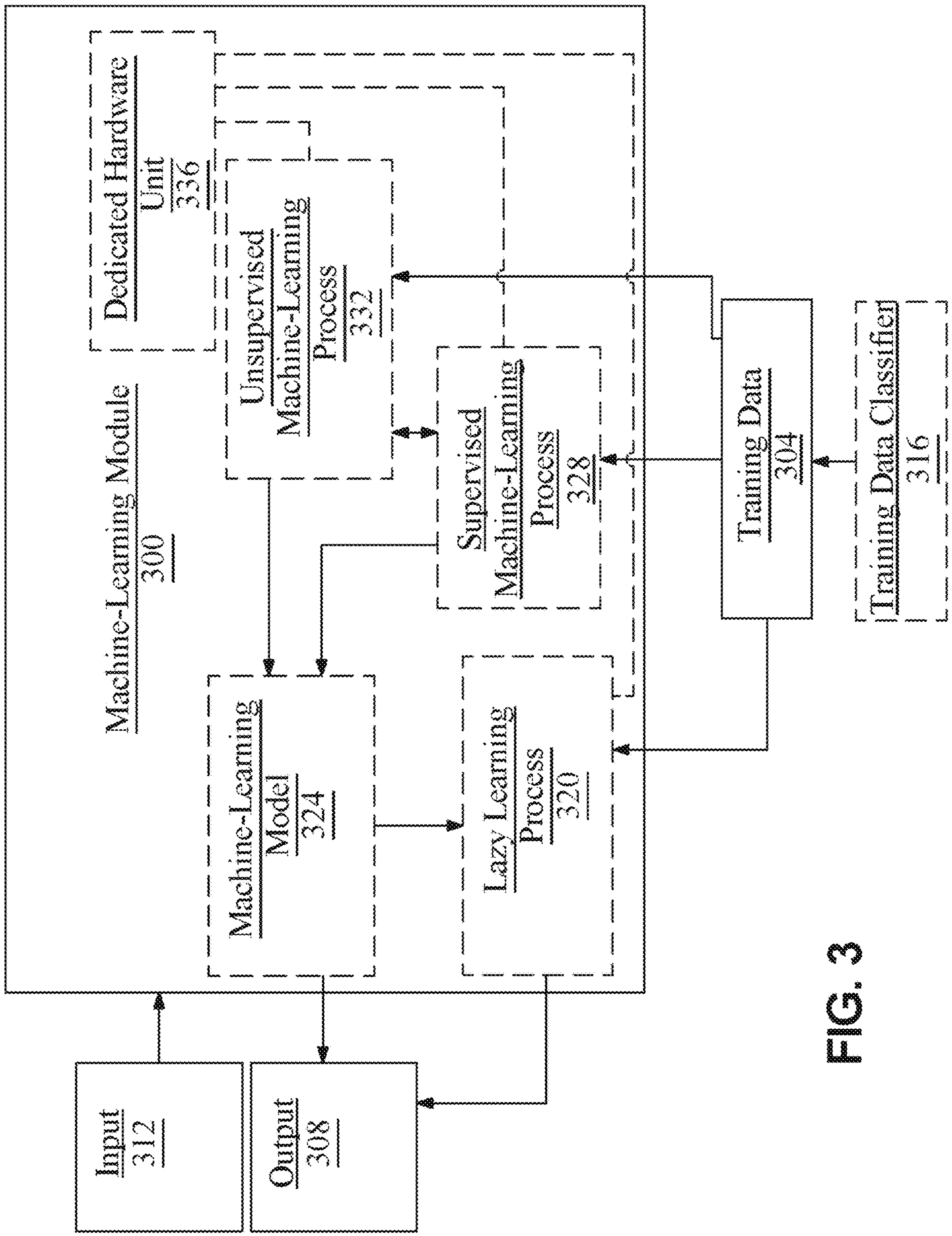
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include textual input, processing elements, and the like. As a non-limiting illustrative example, output data may include processed textual input, processing elements, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to user cohorts related to user's demographic, such as age, gender, occupation, and the like, location, and the like.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or using user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created using the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include textual input, processing elements, and the like as described above as inputs, processed textual input, processing elements, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation, gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic “1” and “0” voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
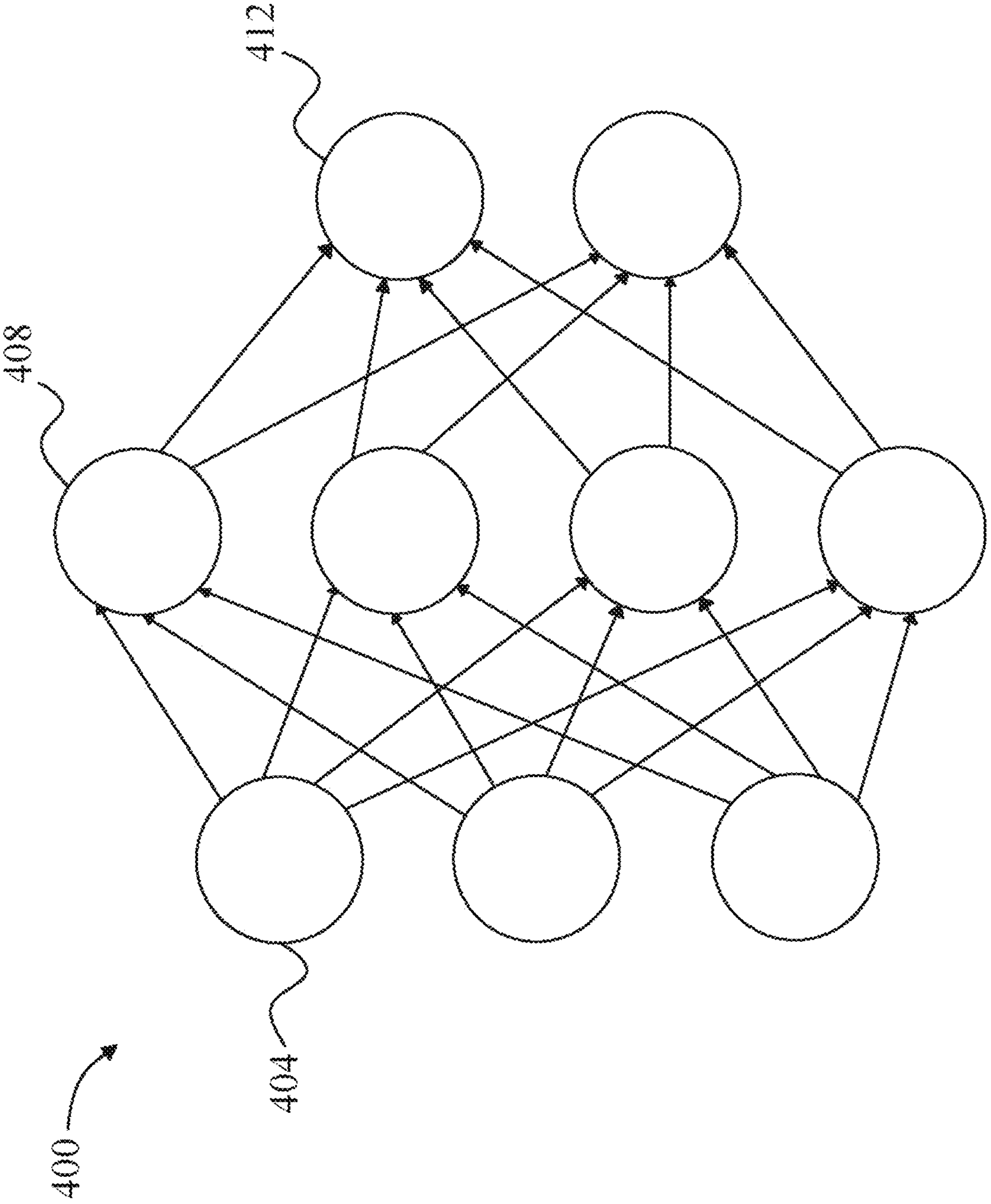
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created using the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
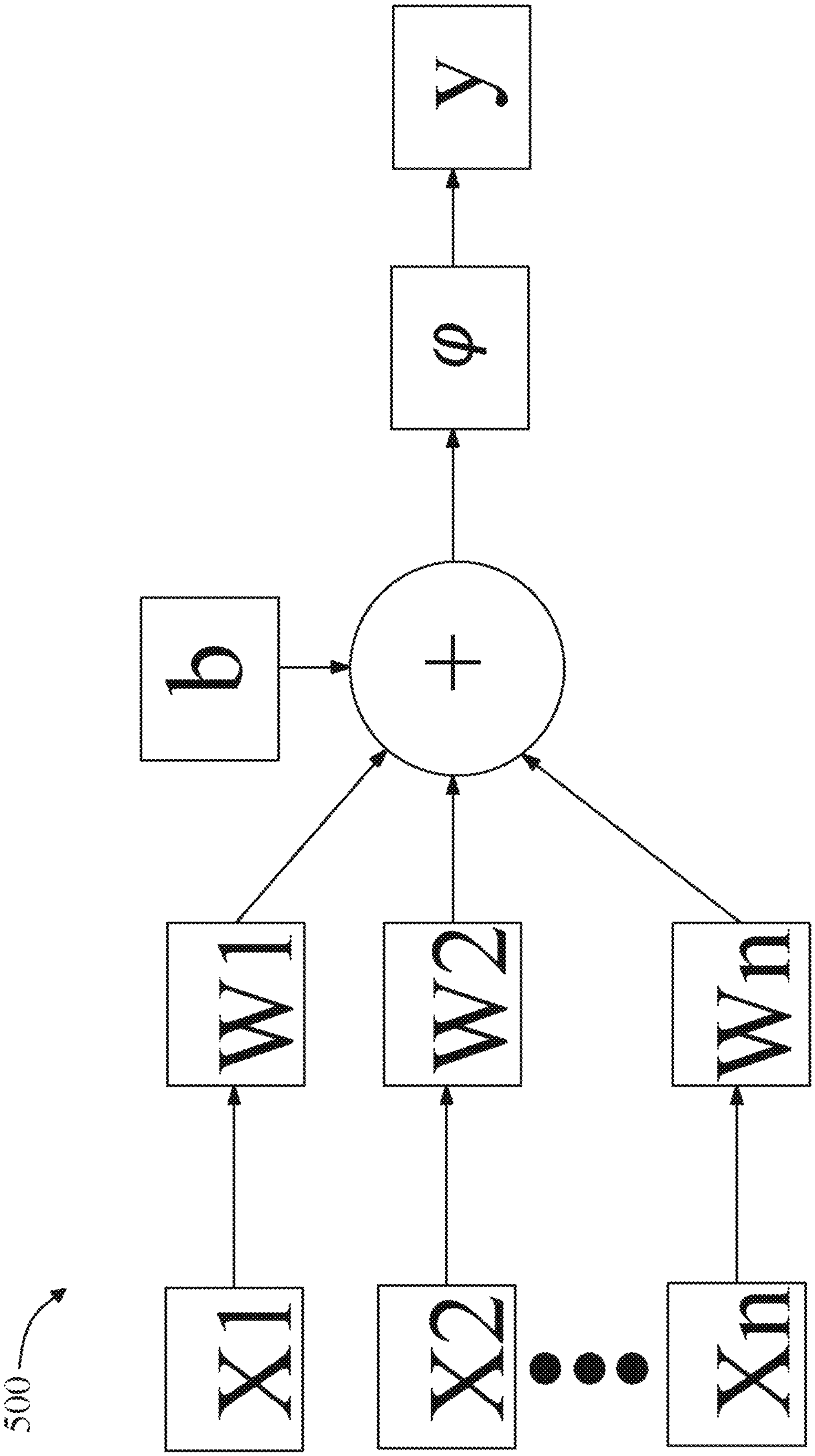
FIG. 5 illustrates a block diagram of an exemplary node in a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $$f(x) = a\left(1 + \tanh\left(\sqrt{2/\pi}\,(x + bx^r)\right)\right)$$

for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha\frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 6:
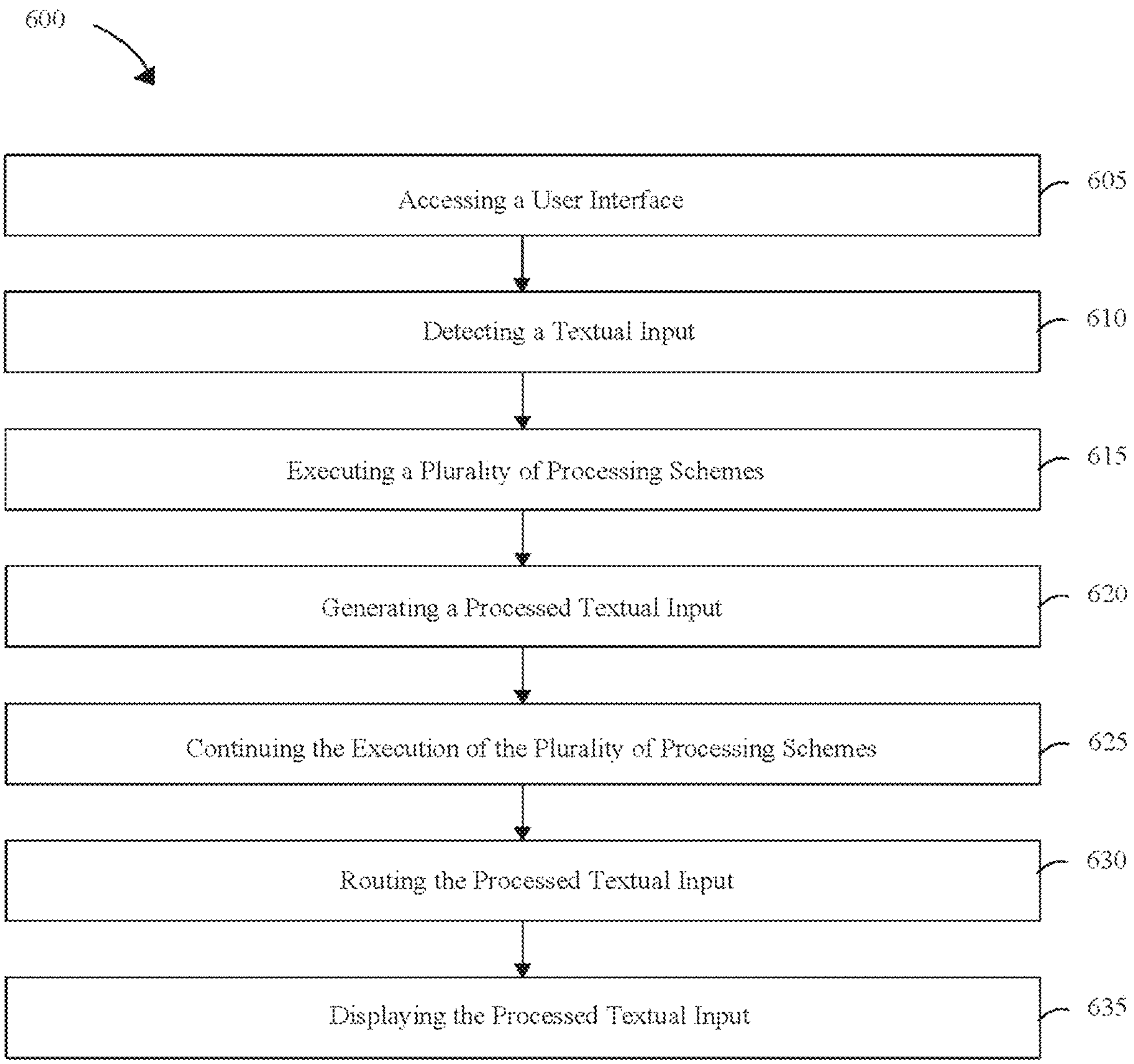
FIG. 6 illustrates a flow diagram of an exemplary method of preventing leakage of sensitive data to an artificial intelligence system.

Referring now to FIG. 6, a flow diagram of an exemplary method 600 of preventing leakage of sensitive data to an artificial intelligence system. Method 600 contains a step 605 of accessing, using at least a processor, a user interface that a user operates using a user device. This may be implemented with reference to FIGS. 1-5.

With continued reference to FIG. 6, method 600 contains a step 610 of detecting, using at least a processor and at the user interface, a textual input from a user. In some embodiments, detecting the textual input may include detecting, at the user interface, a plurality of keystrokes generated by the user, and assembling the plurality of keystrokes into the textual input. These may be implemented with reference to FIGS. 1-5.

With continued reference to FIG. 6, method 600 contains a step 615 of executing, using at least a processor, a plurality of processing schemes in a cascading sequence to identify one or more processing elements within a textual input, wherein execution of a first processing scheme modifies the textual input to generate an intermediate representation and passes the intermediate representation to a subsequent processing scheme; and each of the plurality of processing schemes is configured to identify a different category of the one or more processing elements. In some embodiments, method 600 may further include in response to identifying the one or more processing elements, suspending keystroke processing at the user interface, and in response to determining that no further processing elements are identified within the processed textual input, resuming the keystroke processing at the user interface. In some embodiments, suspending and resuming the keystroke processing may include in response to identifying the one or more processing elements, locking a text input field of the user interface to prevent further keystrokes, and in response to determining that no further processing elements are identified, unlocking the text input field to allow further keystrokes. These may be implemented with reference to FIGS. 1-5.

With continued reference to FIG. 6, method 600 contains a step 620 of generating, using at least a processor, a processed textual input by modifying each of one or more processing elements using one or more corresponding data masks. In some embodiments, executing the plurality of processing schemes in the cascading sequence may include identifying one or more contextual factors of the textual input as a function of the one or more processing elements, and determining a processing order of the cascading sequence as a function of the one or more contextual factors, and executing the plurality of processing schemes in the processing order of the cascading sequence. In some embodiments, executing the plurality of processing schemes in the cascading sequence may include determining a processing order of the cascading sequence as a function of a computational efficiency metric of the one or more processing elements. In some embodiments, executing the plurality of processing schemes in the cascading sequence may include receiving a user authentication credential from the user interface, and selecting one or more of the plurality of processing schemes as a function of user authentication credential. In some embodiments, modifying each of the one or more processing elements using the one or more corresponding data masks may include determining the one or more data masks for each of the one or more processing elements using a mask classifier, wherein the mask classifier has been trained with mask training data including exemplary processing elements correlated to exemplary data masks. These may be implemented with reference to FIGS. 1-5.

With continued reference to FIG. 6, method 600 contains a step 625 of continuing, using at least a processor, execution of a plurality of processing schemes on a processed textual input until no further processing elements are identified. This may be implemented with reference to FIGS. 1-5.

With continued reference to FIG. 6, method 600 contains a step 630 of in response to determining that no further processing elements are identified within a processed textual input, routing, using at least a processor, the processed textual input to an external system for processing. In some embodiments, method 600 may further include receiving, using a language model of the external system, the processed textual input from the at least a processor, and generating, using the language model, a response as an output as a function of the processed textual input. These may be implemented with reference to FIGS. 1-5.

With continued reference to FIG. 6, method 600 contains a step 635 of in response to determining that no further processing elements are identified within a processed textual input, displaying, using at least a processor and at a user interface, the processed textual input. In some embodiments, displaying the processed textual input at the user interface may include generating a visual indicator highlighting a portion of the textual input corresponding to the one or more processing elements. These may be implemented with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
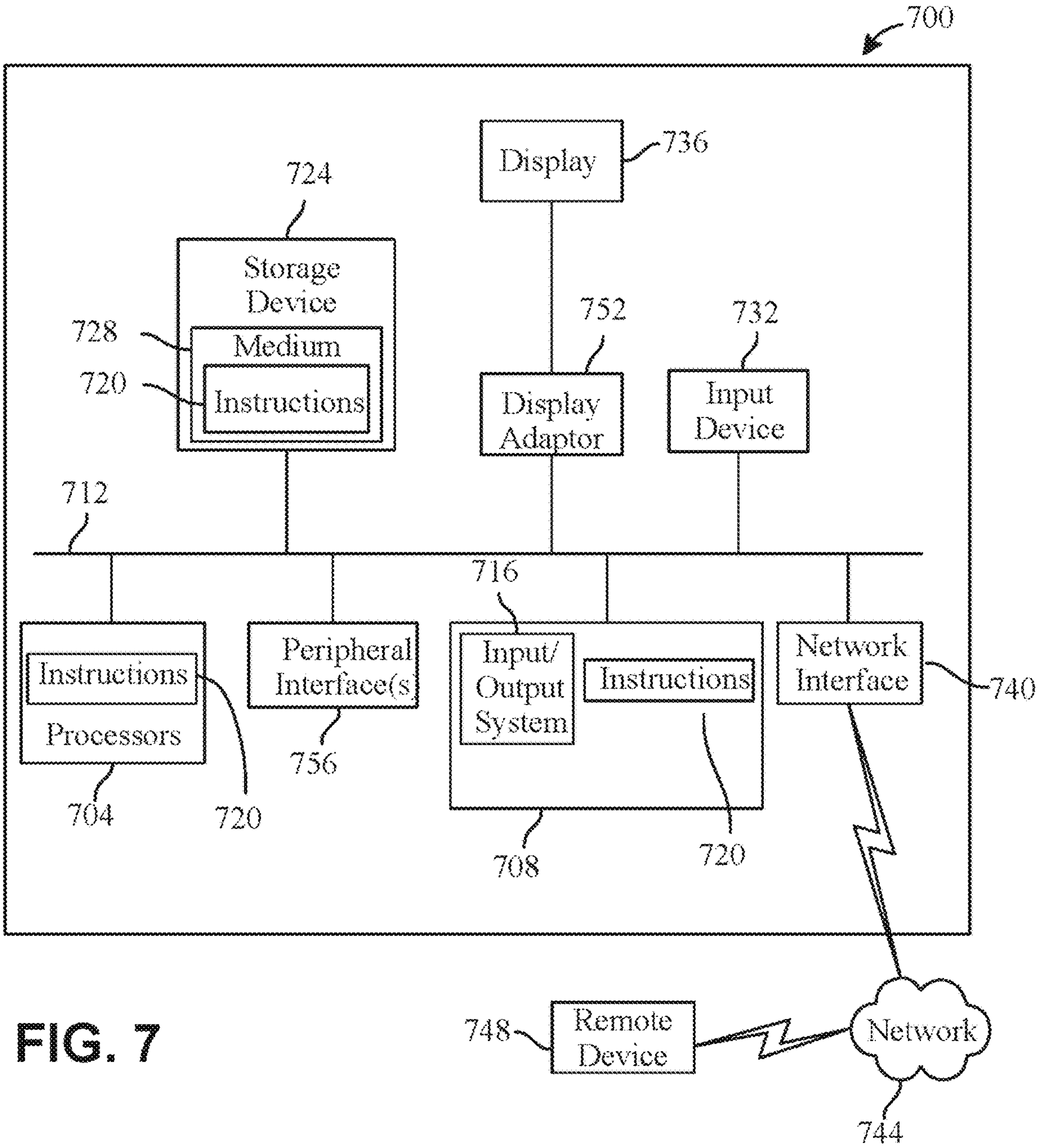
FIG. 7 illustrates a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, using a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., using an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may include an input device 732. In one example, a user of computer system 700 may enter commands and/or other information into computer system 700 using input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 using any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 using storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 using network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 using a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail using a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto using a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 8:
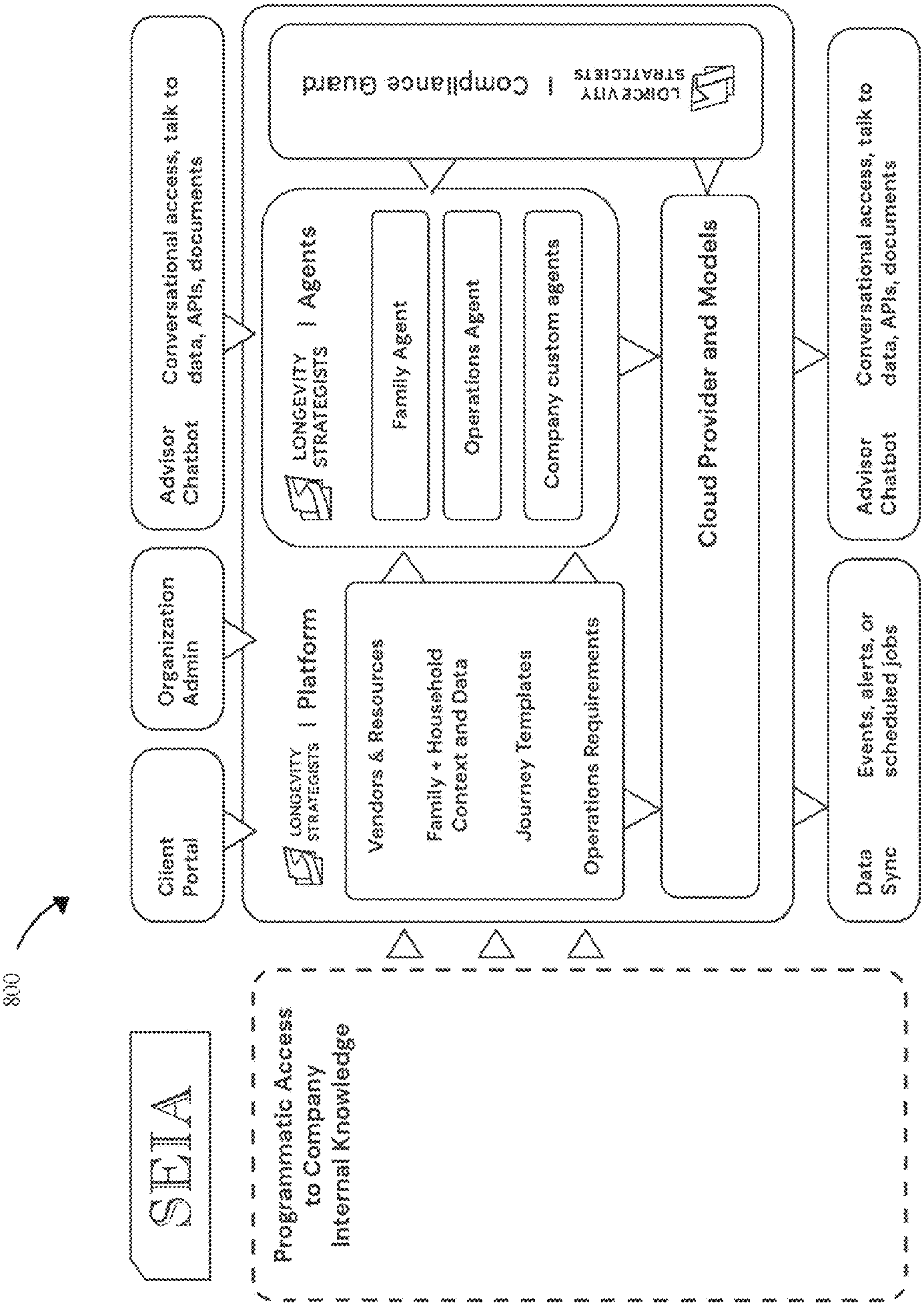
FIG. 8 illustrates a block diagram of a multi-layer artificial intelligence system.

Referring to FIG. 8, an exemplary diagram 800 of a multi-layer artificial intelligence system is illustrated. An exemplary diagram 800 illustrates a high-level architectural view of an enterprise-integrated artificial intelligence platform configured to operate within regulated environments such as financial advisory and professional services. Diagram 800 depicts the manner in which multiple subsystems, including enterprise data sources, a core platform layer, specialized artificial-intelligence agents, cloud-based model execution environments, and a compliance guard, interoperate to provide secure, context-aware, and regulation-aligned AI functionality.

With continued reference to FIG. 8, diagram 800 includes a programmatic access layer disposed on the left side of the figure. In some embodiments, the programmatic access layer may include secure connectors, ingestion pipelines, and authenticated APIs configured to retrieve enterprise data from internal systems such as meeting systems, messaging systems, planning platforms, and account-management tools. As described in the due diligence materials, such data ingestion may occur via SOC-2-aligned interfaces using encryption, access controls, and identity-management mechanisms such as Single Sign-On (SSO). These programmatic interfaces allow the system to access and synchronize structured and unstructured data across corporate applications including meetings, emails, SMS messages, advisor notes, plans, and account information.

With continued reference to FIG. 8, diagram 800 further includes a core platform layer that functions as the chassis upon which downstream agents operate. In some embodiments, the core platform layer may include vendor and resource repositories, a family and household context model, journey templates, and operational and compliance requirements. The family and household context model may represent multi-person household structures, relationships among household members, life-stage attributes, caregiving contexts, and temporal events, enabling AI agents to reason about a system of individuals rather than a single client. Journey templates may define sequenced processes tailored to client needs, such as retirement transitions, caregiving events, or financial-planning workflows. Operational requirements may include firm-specific procedures, regulatory rules, and compliance-guardrails. This platform layer forms the "canvas" upon which all agents perform reasoning tasks, ensuring that AI outputs remain aligned with institutional processes and household-level context.

With continued reference to FIG. 8, diagram 800 also illustrates a multi-agent layer comprising a plurality of specialized agents, such as a family agent, an operations agent, and one or more enterprise-specific custom agents. In some embodiments, the family agent may evaluate family-context data and provide personalized insights relating to household dynamics, care-coordination needs, or vulnerability indicators. The operations agent may evaluate advisor actions or client requests against internal procedures and regulatory constraints. Custom agents may enable firms to encode proprietary reasoning processes or domain-specific expertise. The system may be intentionally designed to support multiple agents operating concurrently over the same contextual dataset, allowing more robust and auditable decision-making than a monolithic model.

With continued reference to FIG. 8, diagram 800 includes a compliance guard subsystem positioned adjacent to the multi-agent layer. In some embodiments, the compliance guard subsystem may enforce role-based access control, validate outbound language-model requests, redact sensitive data, block non-permissible content, and ensure that agents do not violate regulatory constraints or modify enterprise data without explicit authorization. The due diligence questionnaire highlights internal controls such as audit logging, encryption, incident-response policies, third-party risk frameworks, and access-review cycles, all of which may be enforced or integrated into the compliance guard subsystem. This subsystem is architecturally independent from the agents and serves as a non-bypassable security and compliance layer, ensuring technical safeguards rather than policy-level guidance alone.

With continued reference to FIG. 8, diagram 800 further includes a cloud provider and model execution layer, which may utilize infrastructure. In some embodiments, this cloud layer may host large language models, vector search engines, agent orchestration tools, and scheduled compute jobs. The system may rely on cloud-provider services for secure execution of model inference, credential-isolated API access, and scaling of computational workloads. As described in the due diligence documentation, the cloud layer may implement SOC-2-aligned security controls including vulnerability scanning, network segmentation, and multi-factor authentication.

With continued reference to FIG. 8, diagram 800 also includes several user-facing interfaces, such as a client portal, an organization-administration console, and an advisor chatbot. In some embodiments, the advisor chatbot may provide conversational access to enterprise knowledge, household context, and compliant operational workflows. The client portal may present adaptive journeys and context-appropriate information to end users. The organization-administration console may permit enterprise users to manage custom agents, resource libraries, compliance configurations, and operational rules. Role-based permissions, as noted in the due diligence materials, may govern access to each interface to ensure that users interact only with authorized system components.

With continued reference to FIG. 8, the system and methods depicted therein may be integrated into, and operate in coordination with, the functions of apparatus 100 described with respect to FIG. 1 to enhance privacy-preserving control over sensitive textual input. For example, the detection, masking, and visual-indicator logic described with respect to FIG. 8 may be incorporated directly into processor 104 and its associated processing schemes 136 so that the visual state transitions, highlighting events, and GUI-level masking behaviors illustrated in FIG. 8 serve as the user-facing manifestation of the underlying redaction pipeline described in FIG. 1. In such embodiments, visual indicator generation described with respect to FIG. 8, event flow management, and interface-update routines may be executed as part of the same cascading sequence 140 used to detect processing elements 144, thereby enabling real-time rendering of highlights, mask placeholders, or warning icons whenever a processing scheme 136 identifies a sensitive segment within textual input 120.

With continued reference to FIG. 8, the system may further be used to implement the display-level behaviors discussed throughout FIG. 1, including locking and unlocking the text input field, suspending keystroke processing 168, synchronizing unmasked and masked views, and presenting interactive visual cues corresponding to applied data masks 152. For example, when processor 104 detects a processing element 144 and applies a data mask 152, interface logic described with respect to FIG. 8 may immediately annotate the corresponding region using color-coding, hover tooltips, or categorical icons to signal the masking event. Similarly, GUI-driven confirmation workflow described with respect to FIG. 8 may be employed as the mechanism through which processed textual input 128 is displayed for user verification prior to routing to external system 124. In this manner, the operational processes of FIG. 1, particularly identification, masking, classification, and completion of cascading sequence 140, may be complemented by detailed user-interface mechanisms described with respect to FIG. 8, ensuring that every internal privacy-filtering action is transparently communicated to the user through consistent, real-time visual indicators.

What is claimed is:

1. An apparatus for preventing leakage of data to an artificial intelligence system, the apparatus comprising:
- at least a processor; and
- a memory communicatively connected to the at least a processor, wherein the memory contains instructions configuring the at least a processor to:
  - access a user interface that a user operates using a user device;
  - detect, at the user interface, a textual input from the user, wherein detecting the textual input comprises:
    - intercepting, using one or more event listeners bound to one or more input widgets of the user interface, low-level input events:
    - timestamping each of the low-level input events, associating each of the low-level input events with a caret position, and buffering resulting characters in the memory to assemble the textual input while preserving ordering, wherein assembling the textual input includes performing partial assembly of the textual input during real-time input by segmenting the textual input into tokens or spans after detecting a token boundary;
  - execute a plurality of processing schemes in a cascading sequence to identify one or more processing elements within the textual input, wherein:
    - execution of a first processing scheme modifies the textual input to generate an intermediate representation and passes the intermediate representation to a subsequent processing scheme;
    - each of the plurality of processing schemes is configured to identify a different category of the one or more processing elements; and
    - the at least a processor is configured to trigger at least one of the plurality of processing schemes on the tokens or spans before transmission of the processed textual input to the artificial intelligence system;
  - generate a processed textual input by modifying each of the one or more processing elements using one or more corresponding data masks;
  - continue the execution of the plurality of processing schemes on the processed textual input until no further processing elements are identified; and
  - in response to determining that no further processing elements are identified within the processed textual input:
    - route the processed textual input to an external system for processing; and
    - display, at the user interface, the processed textual input.

2. The apparatus of claim 1, wherein detecting the textual input comprises:
- detecting, at the user interface, a plurality of keystrokes generated by the user; and
- assembling the plurality of keystrokes into the textual input.

3. The apparatus of claim 2, wherein the memory contains instructions further configuring the at least a processor to:
- in response to identifying the one or more processing elements, suspend keystroke processing at the user interface; and
- in response to determining that no further processing elements are identified within the processed textual input after suspending keystroke processing, resume the keystroke processing at the user interface.

4. The apparatus of claim 3, wherein suspending and resuming the keystroke processing comprises:
- in response to identifying the one or more processing elements, locking a text input field of the user interface to prevent further keystrokes; and
- in response to determining that no further processing elements are identified, unlocking the text input field to allow further keystrokes.

5. The apparatus of claim 1, wherein executing the plurality of processing schemes in the cascading sequence comprises:
- identifying one or more contextual factors of the textual input as a function of the one or more processing elements;
- determining a processing order of the cascading sequence as a function of the one or more contextual factors; and
- executing the plurality of processing schemes in the processing order of the cascading sequence.

6. The apparatus of claim 1, wherein executing the plurality of processing schemes in the cascading sequence comprises determining a processing order of the cascading sequence as a function of a computational efficiency metric of the one or more processing elements.

7. The apparatus of claim 1, wherein executing the plurality of processing schemes in the cascading sequence comprises:
- receiving a user authentication credential from the user interface; and
- selecting one or more of the plurality of processing schemes as a function of the user authentication credential.

8. The apparatus of claim 1, wherein modifying each of the one or more processing elements using the one or more corresponding data masks comprises determining the one or more corresponding data masks for each of the one or more processing elements using a mask classifier, wherein the mask classifier has been trained with mask training data comprising exemplary processing elements correlated to exemplary data masks.

9. The apparatus of claim 1, wherein displaying the processed textual input at the user interface comprises generating a visual indicator highlighting a portion of the textual input corresponding to the one or more processing elements.

10. The apparatus of claim 1, wherein the external system comprises a language model configured to:
- receive the processed textual input from the at least a processor; and
- generate a response as an output as a function of the processed textual input.

11. A method of preventing leakage of data to an artificial intelligence system, the method comprising:
- accessing, using at least a processor, a user interface that a user operates using a user device;
- detecting, using the at least a processor and at the user interface, a textual input from the user, wherein detecting the textual input comprises:

intercepting, using one or more event listeners bound to one or more input widgets of the user interface, low-level input events:

timestamping each of the low-level input events, associating each of the low-level input events with a caret position, and buffering resulting characters in the memory to assemble the textual input while preserving ordering, wherein assembling the textual input includes performing partial assembly of the textual input during real-time input by segmenting the textual input into tokens or spans after detecting a token boundary;

executing, using the at least a processor, a plurality of processing schemes in a cascading sequence to identify one or more processing elements within the textual input, wherein:

execution of a first processing scheme modifies the textual input to generate an intermediate representation and passes the intermediate representation to a subsequent processing scheme;

each of the plurality of processing schemes is configured to identify a different category of the one or more processing elements and the at least a processor is configured to trigger at least one of the plurality of processing schemes on the tokens or spans before transmission of the processed textual input to the artificial intelligence system;

generating, using the at least a processor, a processed textual input by modifying each of the one or more processing elements using one or more corresponding data masks;

continuing, using the at least a processor, the execution of the plurality of processing schemes on the processed textual input until no further processing elements are identified; and in response to determining that no further processing elements are identified within the processed textual input:

routing, using the at least a processor, the processed textual input to an external system for processing; and displaying, using the at least a processor and at the user interface, the processed textual input.

12. The method of claim 11, wherein detecting the textual input comprises:

detecting, at the user interface, a plurality of keystrokes generated by the user; and assembling the plurality of keystrokes into the textual input.

13. The method of claim 12, further comprising:

in response to identifying the one or more processing elements, suspending keystroke processing at the user interface; and in response to determining that no further processing elements are identified within the processed textual input after suspending keystroke processing, resuming the keystroke processing at the user interface.

14. The method of claim 13, wherein suspending and resuming the keystroke processing comprises:

in response to identifying the one or more processing elements, locking a text input field of the user interface to prevent further keystrokes; and in response to determining that no further processing elements are identified, unlocking the text input field to allow further keystrokes.

15. The method of claim 11, wherein executing the plurality of processing schemes in the cascading sequence comprises:

identifying one or more contextual factors of the textual input as a function of the one or more processing elements;

determining a processing order of the cascading sequence as a function of the one or more contextual factors; and executing the plurality of processing schemes in the processing order of the cascading sequence.

16. The method of claim 11, wherein executing the plurality of processing schemes in the cascading sequence comprises determining a processing order of the cascading sequence as a function of a computational efficiency metric of the one or more processing elements.

17. The method of claim 11, wherein executing the plurality of processing schemes in the cascading sequence comprises:

receiving a user authentication credential from the user interface; and selecting one or more of the plurality of processing schemes as a function of the user authentication credential.

18. The method of claim 11, wherein modifying each of the one or more processing elements using the one or more corresponding data masks comprises determining the one or more corresponding data masks for each of the one or more processing elements using a mask classifier, wherein the mask classifier has been trained with mask training data comprising exemplary processing elements correlated to exemplary data masks.

19. The method of claim 11, wherein displaying the processed textual input at the user interface comprises generating a visual indicator highlighting a portion of the textual input corresponding to the one or more processing elements.

20. The method of claim 11, further comprising:

receiving, using a language model of the external system, the processed textual input from the at least a processor; and generating, using the language model, a response as an output as a function of the processed textual input.

* * * * *